(12) United States Patent
Kato et al.

(10) Patent No.: US 9,374,574 B2
(45) Date of Patent: Jun. 21, 2016

(54) THREE-DIMENSIONAL VIDEO DISPLAY APPARATUS AND THREE-DIMENSIONAL VIDEO DISPLAY METHOD

(71) Applicant: Panasonic Corporation, Osaka (JP)

(72) Inventors: Yumiko Kato, Osaka (JP); Jun Ozawa, Nara (JP); Tsuyoshi Inoue, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 292 days.

(21) Appl. No.: 14/202,464

(22) Filed: Mar. 10, 2014

(65) Prior Publication Data

US 2014/0184760 A1 Jul. 3, 2014

Related U.S. Application Data

(63) Continuation of application No. PCT/JP2013/004055, filed on Jun. 28, 2013.

(30) Foreign Application Priority Data

Jul. 11, 2012 (JP) ................................. 2012-155975

(51) Int. Cl.
*H04N 13/04* (2006.01)
*G02B 27/22* (2006.01)
(Continued)

(52) U.S. Cl.
CPC ........ *H04N 13/0484* (2013.01); *G02B 27/0093* (2013.01); *G02B 27/22* (2013.01);
(Continued)

(58) Field of Classification Search
CPC ...... G02B 27/0093; G02B 27/22; G09G 5/00; G09G 5/36; H04N 13/0022; H04N 13/0033; H04N 13/0468; H04N 13/0484

USPC ........ 348/52, 51, 53; 386/200, 219, 223, 230, 386/341

See application file for complete search history.

(56) References Cited

U.S. PATENT DOCUMENTS

| 8,650,073 | B2 * | 2/2014 | Littman | ................. | G06Q 30/02 705/14.1 |
| 2011/0261160 | A1 | 10/2011 | Tadokoro et al. | | |

FOREIGN PATENT DOCUMENTS

| JP | 11-000309 | 1/1999 |
| JP | 2007-257087 | 10/2007 |
| JP | 2010-258723 | 11/2010 |
| JP | 2011-249859 | 12/2011 |
| WO | 2011/108180 | 9/2011 |

OTHER PUBLICATIONS

International Search Report issued Aug. 13, 2013 in corresponding International Application No. PCT/JP2013/004055.

(Continued)

*Primary Examiner* — Robert Chevalier
(74) *Attorney, Agent, or Firm* — Wenderoth, Lind & Ponack, L.L.P.

(57) ABSTRACT

A three-dimensional (3D) video display apparatus includes: a viewing action detecting unit which detects whether or not a viewing state of a user who views a plurality of 3D video display screens with a viewing target being changed between the 3D video display screens has changed a predetermined number of times or more in a predetermined time period; and a control unit which restricts user's viewing action of viewing a 3D video image displayed by an image display unit when the viewing action detecting unit detects that the viewing state of the user has changed the predetermined number of times or more in the predetermined time period.

11 Claims, 32 Drawing Sheets

(51) Int. Cl.
G09G 5/00 (2006.01)
G09G 5/36 (2006.01)
G02B 27/00 (2006.01)
H04N 13/00 (2006.01)

(52) U.S. Cl.
CPC . *G09G 5/00* (2013.01); *G09G 5/36* (2013.01); *H04N 13/0022* (2013.01); *H04N 13/0033* (2013.01); *H04N 13/0468* (2013.01); *H04N 13/0429* (2013.01)

(56) References Cited

OTHER PUBLICATIONS

"Input and Recognition of Biometric Verification", JPO hyoujyun gijutsushu (JPO standard technology collection), 2005 Technology classification: 5-1-2 Face/Verification and/or determination technology/Feature amount type F1: G06T7/00 510@B, Technology name: 5-1-2-1 Eigenface method, with partial English translation.

Saori Takeoka et al., "Human Face Extraction for User Identification and Face Direction Recognition", Journal of the Nagoya Women's College, vol. 50, pp. 145 to 151, Mar. 2004, with partial English translation.

Hirotake Yamazoe et al., "Automatic Calibration of 3D Eye Model for Single-Camera Based Gaze Estimation", IEICE Trans. Inf. & Syst., vol. J94-D, No. 6, pp. 998 to 1006, 2011, with partial English translation.

"Guidelines for Effect of Video such as Animation Program" Posted on TV TOKYO Corporation's homepage (http://www.tv-tokyo.co.jp/main/yoriyoi/eizoukouka.html), with partial English translation.

"3DC Safety Guidelines for Dissemination of Human-friendly 3D", 3D Consortium (3DC) Safety/Guidelines Section, Revised on Apr. 20, 2010, with partial English translation.

* cited by examiner

FIG. 17

| ID of glasses | Pulse pattern | Time | Viewing state |
|---|---|---|---|
| 01 | 00101101 | 10:32:15.55 | Viewing |
| 01 | 00101101 | 10:32:16.01 | Viewing |
| 01 | 00101101 | 10:32:16.07 | Viewing |
| 01 | 00101101 | 10:32:16.13 | Non-viewing |
| ⋮ | ⋮ | ⋮ | ⋮ |
| 02 | 11001100 | 10:32:17.36 | Viewing |
| 02 | 11001100 | 10:32:17.42 | Viewing |
| ⋮ | ⋮ | ⋮ | ⋮ |

Circular shape of light
received by receiving unit 211

Shape of light received
by receiving unit 211

FIG. 26

| Face ID | | | | Time | Viewed display | | | |
|---|---|---|---|---|---|---|---|---|
| Subject display | Neighboring 1 | Neighboring 2 | ...Neighboring n | | Subject display | Neighboring 1 | Neighboring 2 | ...Neighboring n |
| 01 | — | — | — | 10:32:15.55 | 1 | 0 | 0 | — |
|  |  |  |  | 10:32:16.01 | 1 | 0 | 0 | — |
|  |  |  |  | 10:32:16.07 | 0 | 1 | 0 | — |
|  |  |  |  | 10:32:16.13 | 0 | 1 | 0 | — |
| 02 | — | 01 | — | 10:32:17.36 | 0 | 0 | 1 | — |
|  |  |  |  | 10:32:17.42 | 0 | 0 | 1 | — |

FIG. 30

| ID of glasses | Time | Viewed display | | | |
|---|---|---|---|---|---|
| | | Subject display | Neighboring 1 | Neighboring 2 | ···Neighboring n |
| 01 | 10:32:15.55 | 1 | 0 | 0 | — |
| 01 | 10:32:16.01 | 1 | 0 | 0 | — |
| 01 | 10:32:16.07 | 0 | 1 | 0 | — |
| 01 | 10:32:16.13 | 0 | 1 | 0 | — |
| ---- | ---- | ---- | ---- | ---- | ---- |
| 02 | 10:32:17.36 | 0 | 0 | 1 | — |
| 02 | 10:32:17.42 | 0 | 0 | 1 | — |
| ---- | ---- | ---- | ---- | ---- | ---- |

FIG. 32

| Time | Frame | Depth information (cm) | | | |
|---|---|---|---|---|---|
| | | Minimum value | Maximum value | Median value | Center value |
| ⋮ | ⋮ | ⋮ | ⋮ | ⋮ | ⋮ |
| 00:23:04.381 | 83062 | -700 | -230 | -534 | -245 |
| 00:23:04.400 | 83063 | -700 | -200 | -527 | -208 |
| 00:23:04.420 | 83064 | -325 | 20 | -50 | 20 |
| ⋮ | ⋮ | ⋮ | ⋮ | ⋮ | ⋮ |

THREE-DIMENSIONAL VIDEO DISPLAY APPARATUS AND THREE-DIMENSIONAL VIDEO DISPLAY METHOD

CROSS REFERENCE TO RELATED APPLICATIONS

This is a continuation application of PCT International Application No. PCT/JP2013/004055 filed on Jun. 28, 2013, designating the United States of America, which is based on and claims priority of Japanese Patent Application No. 2012-155975 filed on Jul. 11, 2012. The entire disclosures of the above-identified applications, including the specifications, drawings and claims are incorporated herein by reference in their entirety.

FIELD

One or more exemplary embodiments disclosed herein relate generally to a three-dimensional (3D) video display apparatus and a three-dimensional (3D) video display method for outputting three-dimensional video images.

BACKGROUND

When viewing 3D video images, eyes move following depth changes of a subject in the 3D video images.

Patent Literature (PTL) 1 discloses detecting a scene change in 3D video images and allowing for smooth depth transition at the time of the scene change.

PTL 2 discloses that when plural video content items are displayed on a mufti-view screen, a video content item designated by a user is displayed in 3D while a video content item undesignated by a user is displayed in 2D.

CITATION LIST

Patent Literature

[PTL 1] Japanese Unexamined Patent Application Publication No. 2010-258723
[PTL 2] Japanese Unexamined Patent Application Publication No. 2011-249859
[PTL 3] Japanese Unexamined Patent Application Publication No. 2007-257087

Non Patent Literature

[NPL 1] Japan Patent Office standard technologies, "input and recognition of biometric verification", technology classification 5-1-2 face/verification and determination technique/feature amount type, technology name 5-1-2-1 Eigenfaces, 2005
[NPL 2] Saori TAKEOKA, et al. "Human Face Extraction for Use Identification and Face Direction Recognition", the fiftieth issue of Journal of Nagoya Women's University, p 145-p 151, 2004
[NPL 3] Yamazoe, et al. "Automatic Calibration of 3D Eye Model for Single-Camera Based Gaze Estimation", Journal of Institute of Electronics, Information and Communication Engineers Vol. DJ94-D, the sixth issue, p 998-p 1006, 2011
[NPL 4] Website of TV TOKYO Corporation, "Guideline for production related to visual effects of cartoon programs and the like" (URL: http://www.tv-tokyo.co.jp/main/yoriyoi/eizoukouka.html)
[NPL 5] 3D Consortium (3DC) Security Guideline "3DC Security Guideline" Apr. 20, 2010 revised

SUMMARY

Technical Problem

However, with the method disclosed by PTL 1, the smooth depth transition cannot be achieved when a user views a plurality of different 3D video images displayed by a plurality of 3D video display apparatuses, with a viewing target being changed between 3D video display screens.

Furthermore, user's action of viewing a plurality of 3D video display screens on which different 3D video images are displayed, with a viewing target being changed between the 3D video display screens, can impose a large load on the visual system of a user who is viewing the 3D video images.

Also with the method disclosed by PTL 2, successive changes in a selected view on the mufti-view screen lead to successive displaying of 3D video images having different depths, which imposes a large load on the visual system of a user as in the case of viewing a plurality of 3D video display screens on which different 3D video images are displayed, with a viewing target being changed between the 3D video display screens.

As described above, the conventional methods have a problem of eye fatigue caused by an increase in the load on the eyes of a user who is viewing 3D video when viewing a plurality of 3D video display screens on which different 3D video images are displayed, with a viewing target being changed between the 3D video display screens.

The exemplary embodiment provides a 3D video display apparatus and a 3D video display method which decrease eye fatigue of users which is caused in the case of viewing a plurality of 3D video display screens on which different 3D video images are displayed, with a viewing target being changed between the 3D video display screens.

Solution to Problem

A three-dimensional (3D) video display apparatus according to an exemplary embodiment disclosed herein includes: a viewing action detecting unit which detects whether or not a viewing state of a user who views a plurality of 3D video display screens with a viewing target being changed between the 3D video display screens has changed a predetermined number of times or more in a predetermined time period; and a control unit which restricts user's viewing action of viewing a 3D video image displayed by an image display unit when the viewing action detecting unit detects that the viewing state of the user has changed the predetermined number of times or more in the predetermined time period.

There general and specific aspects may be implemented using a system, a method, an integrated circuit, a computer program, or a computer-readable recording medium such as a compact disc read only memory (CD-ROM), and may also be implemented by any combination of systems, apparatuses, methods, integrated circuits, computer programs, and recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

With the 3D video display apparatus and the 3D video display method according to one or more exemplary embodiments or features disclosed herein, it is possible to decrease the eye fatigue of a user which is caused when viewing a plurality of 3D video display screens on which different 3D video images are displayed, with a viewing target being changed between the 3D video display screens.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 17 is a diagram showing an example of data stored in a face storage unit according to Embodiment 2.

FIG. 26 is a diagram showing an example of data stored in a history storage unit according to Embodiment 3.

FIG. 30 is a diagram showing an example of data stored in a history storage unit according to Embodiment 4.

FIG. 32 is a diagram showing an example of data stored in a depth information storage unit according to the modification example of Embodiment 3.

DESCRIPTION OF EMBODIMENTS

Figure 1:
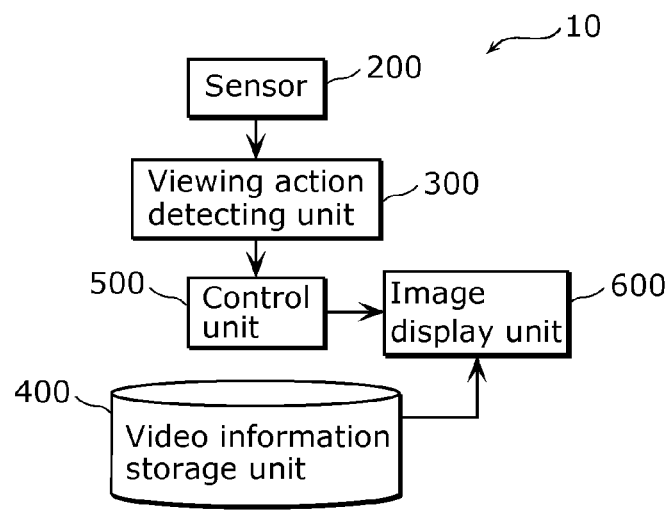
FIG. 1 is a block diagram showing an example of a configuration of a 3D video display apparatus according to Embodiment 1.

A three-dimensional (3D) video display apparatus according to an exemplary embodiment disclosed herein includes: a viewing action detecting unit which detects whether or not a viewing state of a user who views a plurality of 3D video display screens with a viewing target being changed between the 3D video display screens has changed a predetermined number of times or more in a predetermined time period; and a control unit which restricts user's viewing action of viewing a 3D video image displayed by an image display unit when the viewing action detecting unit detects that the viewing state of the user has changed the predetermined number of times or more in the predetermined time period.

With this, it is possible to avoid the state in which depth change frequently occurs due to frequent scene change caused by the viewing action of the user, allowing for decreasing user's fatigue caused by the user action.

For example, the above-described 3D video display apparatus further includes a camera which captures an image of a face of the user, wherein the viewing action detecting unit includes: a face angle calculating unit which calculates an angle of the face, using the image of the face captured by the camera; a state determining unit which determines whether or not the user is viewing one of the plurality of 3D video display screens, based on the angle of the face calculated by the face angle calculating unit; and a high-frequency-change detecting unit which detects, based on a result of the determination by the state determining unit, whether or not the viewing state of the user has changed the predetermined number of times or more in the predetermined time period.

In addition, the above-described 3D video display apparatus may further include a light receiving unit which receives light emitted by a light emitting unit mounted on special glasses worn by the user, wherein the viewing action detecting unit may include: an incident angle measuring unit which measures an incident angle of the light emitted by the light emitting unit into the light receiving unit; a state determining unit which determines whether or not the user is viewing one of the plurality of 3D video display screens, based on the incident angle measured by the incident angle measuring unit; and a high-frequency-change detecting unit which detects, based on a result of the determination by the state determining unit, whether or not the viewing state of the user has changed the predetermined number of times or more in the predetermined time period.

More specifically, the light emitting unit may emit circular light, and the incident angle measuring unit may measure, based on a shape of the light received by the light receiving unit, the incident angle of the light emitted by the light emitting unit into the light receiving unit.

In addition, the above-described 3D video display apparatus may further include: a camera which captures an image of a face of the user; and one of the plurality of 3D video display screens, wherein the viewing action detecting unit may include: a face extracting unit which extracts, from the image of the face captured by the camera, a feature amount of the image of the face; a face angle calculating unit which calculates an angle of the face, using the image of the face captured by the camera; a state determining unit which determines, based on the angle of the face calculated by the face angle calculating unit, whether or not the user is viewing one of the plurality of 3D video display screens; a receiving unit which receives, from another 3D video display apparatus, a feature amount of an image of a face and a determination result indicating whether or not the user is viewing another one of the plurality of 3D video display screens included in the other 3D video display apparatus; and a high-frequency-change detecting unit which (i) determines whether or not a same user views the one of the plurality of 3D video display screens included in the 3D video display apparatus and the other one of the plurality of 3D video display screens included in the other 3D video display apparatus, by comparing the feature amount of the image of the face extracted by the face extracting unit with the feature amount of the image of the face received by the receiving unit, and (ii) when it is determined that the same user views the one of the plurality of 3D video display screens included in the 3D video display apparatus and the other one of the plurality of 3D video display screens included in the other 3D video display apparatus, detects whether or not the viewing state of the same user has changed the predetermined number of times or more in the predetermined time period, based on the result of determination by the state determining unit and the determination result received by the receiving unit.

When a plurality of 3D video display apparatuses which display 3D video images are placed close to each other, the plurality of 3D video display apparatuses communicate with each other, making it possible to accurately detect the state in which a user is viewing the respective 3D video images with a viewing target being changed between 3D video display screens at a high frequency. With this, it is possible to avoid only the state which produces fatigue and in which depth change frequently occurs due to frequent scene change caused by user's viewing action of alternately viewing the 3D video images, without performing the processing in such a case with smaller strain as alternately viewing an video image and a real space, thereby allowing for alleviation of user's fatigue caused by the user action.

In addition, the above-described 3D video display apparatus may further include: a light receiving unit which receives light which is emitted by a light emitting unit mounted on special glasses worn by the user and which has a light emitting pattern by which the glasses are identified; and one of the plurality of 3D video display screens, wherein the viewing action detecting unit may include: a glasses identifying unit which identifies glasses based on the light emitting pattern of the light received by the light receiving unit; an incident angle measuring unit which measures an incident angle of the light emitted by the light emitting unit into the light receiving unit; a state determining unit which determines, based on the incident angle measured by the incident angle measuring unit, whether or not the user is viewing the one of the plurality of 3D video display screens; a receiving unit which receives, from another 3D video display apparatus, an identification result of glasses worn by a user who is viewing another one of the plurality of 3D video display screens included in the other 3D video display apparatus and a determination result indicating whether or not the user is viewing the other one of the plurality of 3D video display screens included in the other 3D video display apparatus; and a high-frequency-change detecting unit which (i) determines whether or not a same user views the one of the plurality of 3D video display screens included in the 3D video display apparatus and the other one of the plurality of 3D video display screens included in the other 3D video display apparatus, by comparing a result of the identification by the glasses identifying unit with the identification result received by the receiving unit, and (ii) when it is determined that the same user views the one of the plurality of 3D video display screens included in the 3D video display apparatus and the other one of the plurality of 3D video display screens included in the other 3D video display apparatus, detects whether or not a viewing state of the same user has changed the predetermined number of times or more in the predetermined time period, based on the result of determination by the state determining unit and the determination result received by the receiving unit.

When a plurality of 3D video display apparatuses which display 3D video images are placed close to each other, the plurality of 3D video display apparatuses communicate with each other, making it possible to accurately detect, based on matching check on a result of identification of glasses, the state in which a user is viewing the respective 3D video images with a viewing target being changed between 3D video display screens at a high frequency. With this, it is possible to avoid only the state which is likely to produce fatigue and in which depth change frequently occurs due to frequent scene change caused by a user's viewing action of alternately viewing the 3D video images, without performing the processing in such a case with smaller strain as alternately viewing an video image and a real space, thereby allowing for alleviation of user's fatigue caused by the user action without disrupting the viewing of 3D video images by the user as much as possible.

More specifically, the control unit may render a 3D video image into a 2D video image and display the 2D video image on the image display unit when the viewing action detecting unit detects that the viewing state of the user has changed the predetermined number of times or more in the predetermined time period.

In addition, the control unit may display, on the image display unit, an attention-drawing message regarding viewing of the 3D video image when the viewing action detecting unit detects that the viewing state of the user has changed the predetermined number of times or more in the predetermined time period.

In addition, the receiving unit may further receive, from the other 3D video display apparatus, depth information of the 3D video image displayed by the other 3D video display apparatus, and the control unit may execute processing for restricting user's viewing action of viewing the 3D video image displayed by the image display unit only when the viewing action detecting unit detects that the viewing state of the user has changed the predetermined number of times or more in the predetermined time period, and a difference between depth information of a 3D video image displayed by the image display unit and the depth information of the 3D video image displayed by the other 3D video display apparatus is a predetermined value or larger.

When a plurality of 3D video display apparatuses which display 3D video images are placed close to each other, the 3D video display apparatuses communicate with each other. It is possible to restrict viewing of 3D video images only when there is a difference in depth between video images each displayed by a different one of the 3D video display apparatuses, and thus fatigue is likely to be produced when a user views a plurality of 3D video display image screens with a viewing target being changed between the 3D video display screens.

With this, it is possible to avoid only the state in which a user is prone to fatigue due to frequent changes in depth resulting from frequent scene change caused by the user's viewing action, while not interrupting the joy of or reducing the convenience in viewing the 3D video images when fatigue is not likely to be produced by viewing the a plurality of 3D video display apparatuses with a target of viewing being changed between the 3D video display screens.

There general and specific aspects may be implemented using a system, a method, an integrated circuit, a computer program, or a computer-readable recording medium such as a compact disc read only memory (CD-ROM), and may also be implemented by any combination of systems, methods, integrated circuits, computer programs, and recording media.

Hereinafter, the 3D video display apparatus according to an aspect of the exemplary embodiments will be specifically described below with reference to the Drawings.

Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are not necessarily indispensable but described as arbitrary structural elements.

Embodiment 1

In this exemplary embodiment, a 3D video display apparatus is described which detects a state in which a user who views 3D video images is alternately viewing a plurality of 3D video display apparatuses which display different 3D video images, to reduce a depth difference in video images before and after a change of the 3D video display apparatus gazed by the user. It is to be noted that, in the case where there are three or more 3D video display apparatuses, an order in which a user views the 3D video display apparatuses is not limited, and the order of viewing the 3D video display apparatuses is randomly determined.

In addition, although a state is assumed in which a user alternately views two 3D video display apparatuses in the description below, the state is not limited to this, as long as a plurality of 3D video images are viewed with a viewing target being changed between the 3D video images. For example, a single 3D video display apparatus may include a plurality of 3D video display screens each of which displays a 3D video image, and a user may view the 3D video display screens with a viewing target being changed between the 3D video display screens.

FIG. 1 is a block diagram showing an example of a configuration of the 3D video display apparatus according to Embodiment 1.

A 3D video display apparatus 10 includes: a sensor 200; a viewing action detecting unit 300; a video information storage unit 400; a control unit 500; and an image display unit 600.

The sensor 200 is a sensor for sensing the state of a user and specifically a camera, a biosignal sensor, and so on. The sensor 200 outputs information on the user state to the viewing action detecting unit 300.

The viewing action detecting unit 300 detects a state in which a user alternately views the 3D video display apparatus 10 and another 3D video display apparatus based on the information on the user state outputted from the sensor 200.

Figure 2:
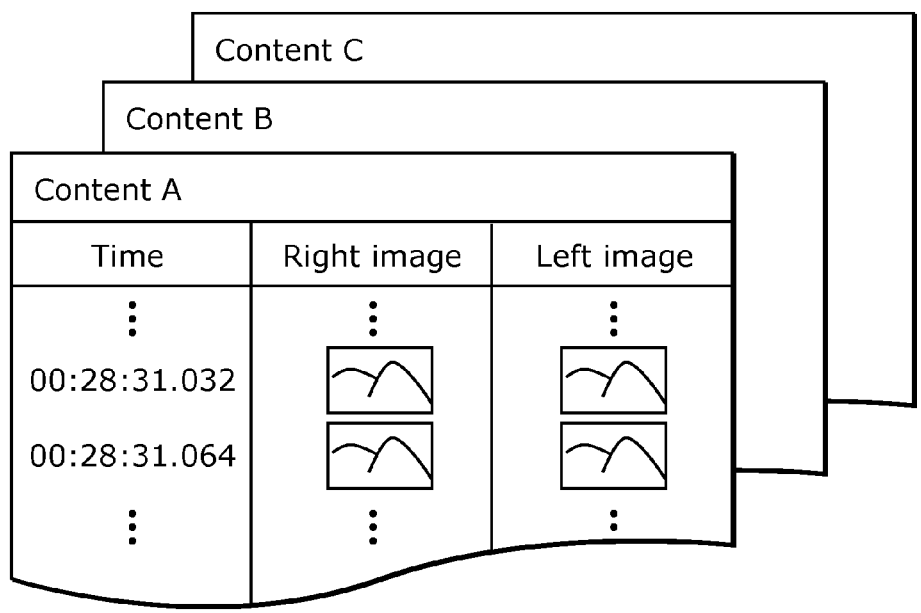
FIG. 2 is a diagram showing an example of a 3D video stored in a video information storage unit according to Embodiment 1.

The video information storage unit 400 is a storage apparatus for storing 3D video information items to be displayed by the 3D video display apparatus 10 (hereinafter referred simply as "3D video images"). FIG. 2 is a diagram showing an example of a 3D video image stored in the video information storage unit 400.

The 3D video image includes a time, a right image, and a left image, for example.

The control unit 500 outputs, to the image display unit 600, a control signal for displaying 2D video images on the 3D video display apparatus 10 when the viewing action detecting unit 300 detects a state in which a user alternately views the 3D video display apparatus 10 and another 3D video display apparatus.

The image display unit 600 performs processing, according to the control signal outputted from the control unit 500, on the 3D video images stored in the video information storage unit 400, and displays the video images.

Figure 3:
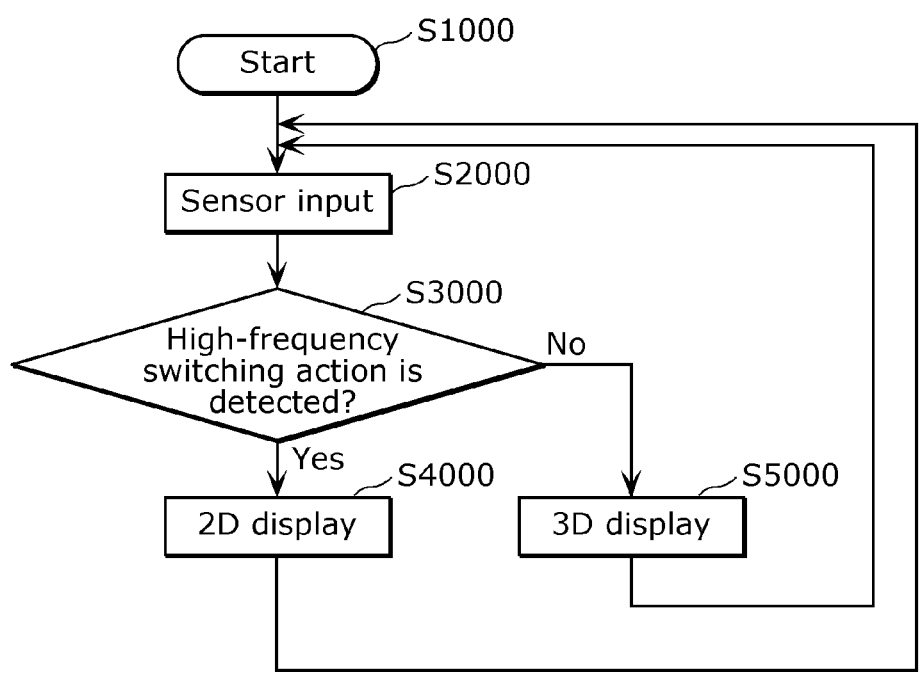
FIG. 3 is a flow chart showing an example of operations performed by the 3D video display apparatus according to Embodiment 1.

FIG. 3 is a flow chart showing operations performed by the 3D video display apparatus 10 according to Embodiment 1. Processing steps of the 3D video display apparatus 10 will be described according to FIG. 3.

The 3D video display apparatus 10 starts to operate when powered on (S1000). Next, the sensor 200 starts to operate and obtains information on a user state of a user (S2000). The viewing action detecting unit 300 detects, based on the information on the user state obtained from the sensor 200, a high-frequency switching action which is the state in which a user alternately views the 3D video display apparatus 10 and another 3D video display apparatus (S3000). When the high-frequency switching action of the user is detected in Step S3000 (Yes in S3000), the control unit 500 outputs a control signal for displaying a video image in two dimensions on the image display unit 600; that is, a two-dimensional (2D) rendering signal. The image display unit 600 displays, in two dimensions, 3D video images stored in the video information storage unit 400, based on the 2D rendering signal (S4000). When the high-frequency switching action of the user is not detected in Step S3000 (No in S3000), the image display unit 600 displays, in three dimensions, the 3D video images stored in the video information storage unit 400 (S5000). After executing Step S4000 and Step S5000, the operation returns to Step S2000 and repeats execution from Step 2000 to Step S4000 or Step S5000.

Figure 4:
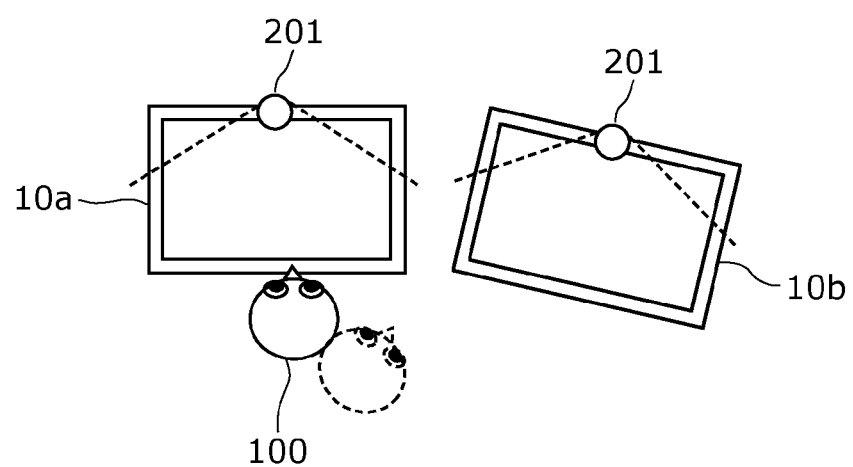
FIG. 4 is a schematic view showing an example of a state in which a user views plural 3D video display apparatuses according to Embodiment 1.

FIG. 4 is a schematic view which shows a concept of the state in which a user alternately views a plurality of 3D video display apparatuses each of which displays a different 3D video image. The plurality of 3D video display apparatuses; that is, a 3D video display apparatus 10a and a 3D video display apparatus 10b are disposed in front of a user 100, and the user 100 can view both of the 3D video display apparatuses. It is to be noted that the 3D video display apparatus 10a and the 3D video display apparatus 10b have the same configuration as that of the 3D video display apparatus 10.

Figure 5:
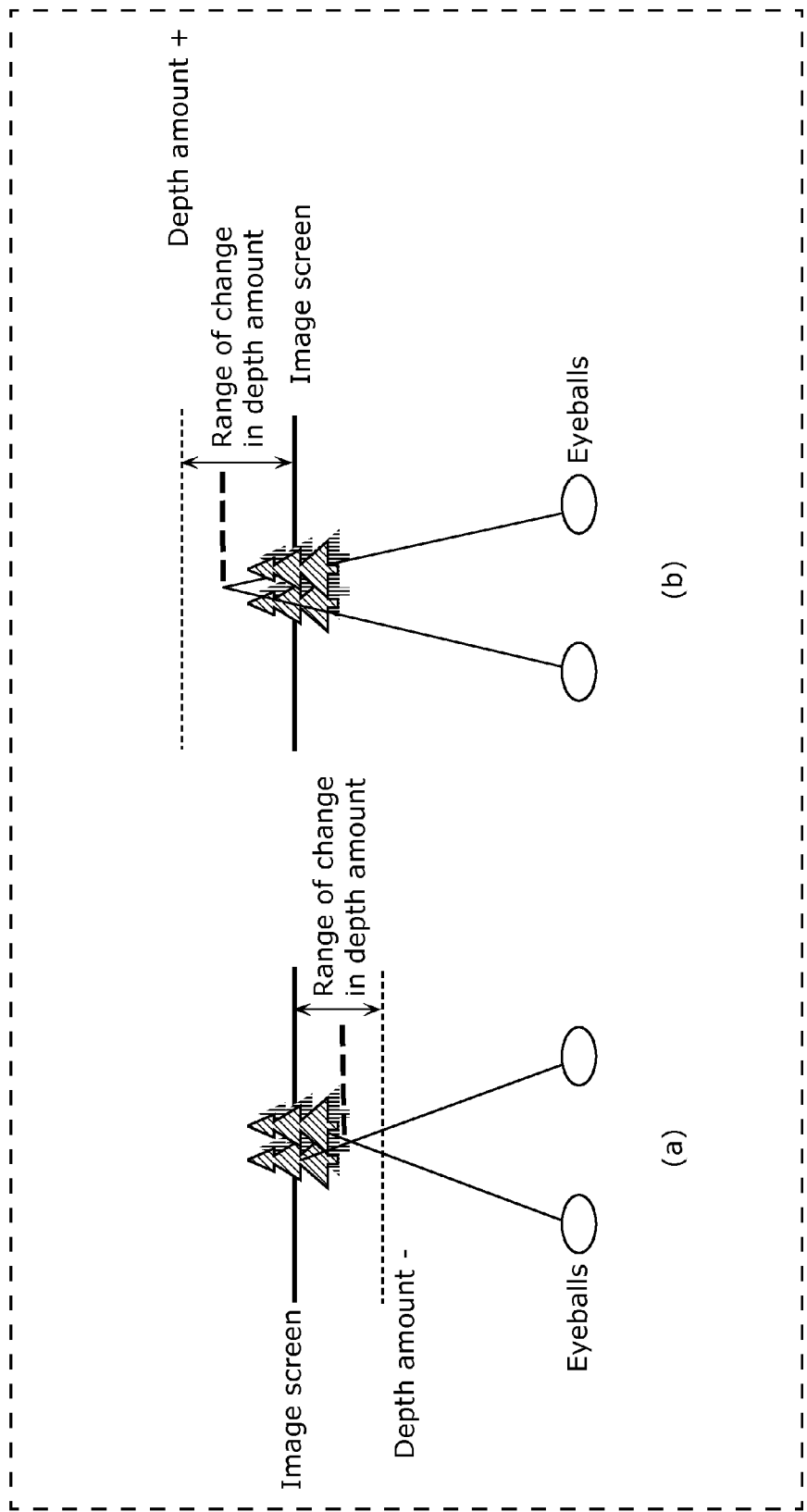
FIG. 5 is a schematic view showing an example of a state in which a content item is displayed, in which (a) shows an example of a state in which the content item is displayed with a depth being on the side closer to a user with respect to a screen, and (b) shows an example of a state in which the content item is displayed with a depth being on the side behind the screen.

For example, a content item, which is a 3D content item of a variety program or the like with a depth being on the side closer to a user with respect to a screen, is displayed on the display screen of the 3D video display apparatus 10a, as shown in (a) in FIG. 5. In addition, a 3D content item, which is a distant-view content item of a travel program or the like with a depth being on the side behind the screen, is displayed on the display screen of the 3D video display apparatus 10b, as shown in (b) in FIG. 5. The depth amount of each content item displayed on a corresponding display screen changes within a predetermined range. However, when the same content item is continuously viewed, there is no strain caused on the eyes of a user. Here, when a user views different genres (depth ranges) of video images on a plurality of image screens as in the examples shown in FIG. 4 and FIG. 5, a user might experience, during view, an amount of change in the depth that exceeds the range free of strain on the eyes of the user, in some cases. The 3D video display apparatus 10 according to the exemplary embodiment avoids such a state.

Figure 6:
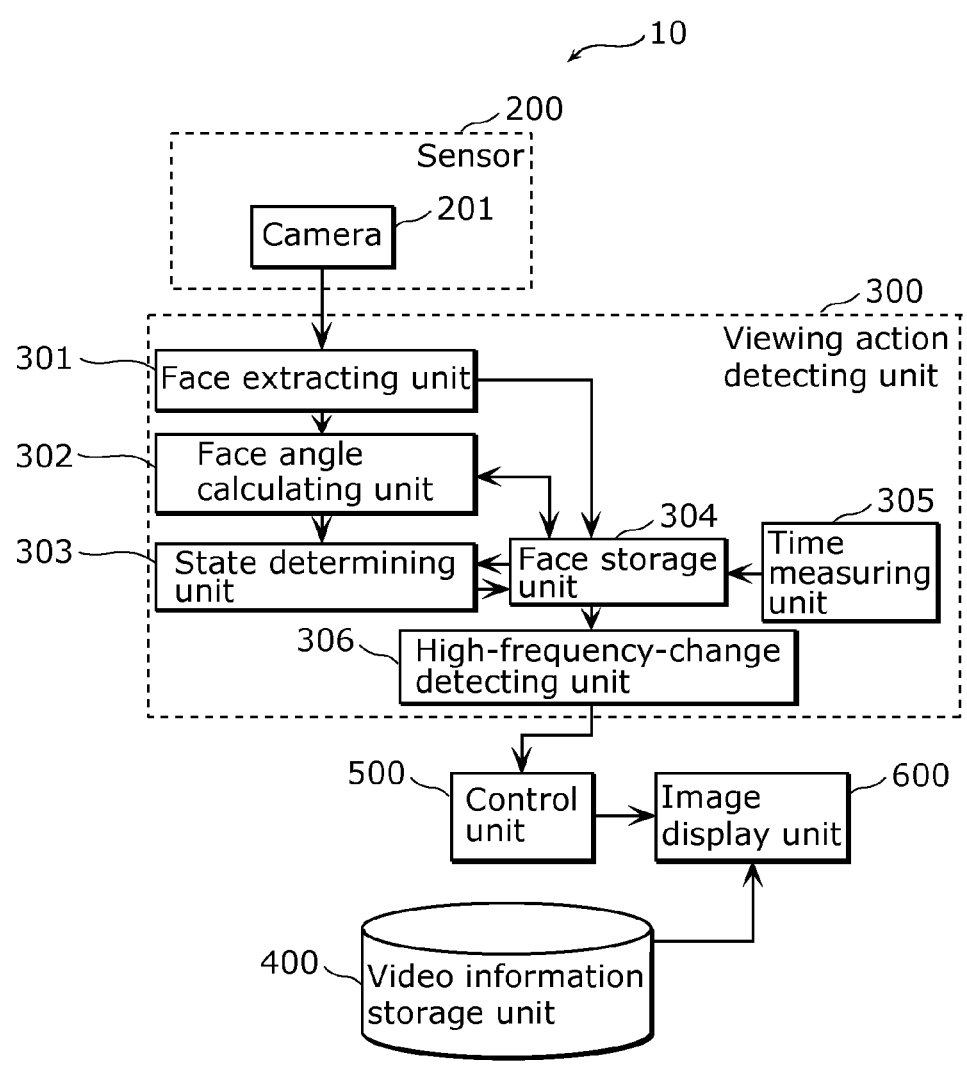
FIG. 6 is a block diagram showing an example of a detailed configuration of the 3D video display apparatus according to Embodiment 1.

FIG. 6 is a block diagram showing an example of a detailed configuration of the 3D video display apparatus 10 (the 3D video display apparatus 10a or the 3D video display apparatus 10b illustrated in FIG. 4) illustrated in FIG. 1.

The sensor 200 includes a camera 201. The camera 201 obtains a video image in front of the 3D video display apparatus 10. As illustrated in FIG. 4, the camera 201 is placed at the upper center of the surface of the screen of the 3D video display apparatus 10 (10a or 10b), for example, and obtains a video image in a range at 120 degrees in horizontal directions from the center of the screen in the horizontal direction, for example.

The viewing action detecting unit 300 includes: a face extracting unit 301; a face angle calculating unit 302; a state determining unit 303; a face storage unit 304; a time measuring unit 305; a high-frequency-change detecting unit 306. The face extracting unit 301 extracts a face image of a person and a feature amount of the face image from the image obtained by the camera 201, and outputs the feature amount of the face image to the face storage unit 304. The face angle calculating unit 302 calculates an angle of the face from the face image extracted by the face extracting unit 301, and outputs the angle to the state determining unit 303 and the face storage unit 304. The state determining unit 303 determines whether the user 100 is viewing the screen of the 3D video display apparatus 10 or the screen of another 3D video display apparatus, by comparing the face angle calculated by the face angle calculating unit 302 and a face angle which is stored earlier in the face storage unit 304, and outputs the viewing state of the user to the face storage unit 304. The face storage unit 304 stores, in association with each other, an ID of a face, the time of obtainment of the image from which the face image is extracted, the feature amount of the face image outputted from the face extracting unit 301, the face angle calculated by the face angle calculating unit 302, and the viewing state detected by the state determining unit 303. The time measuring unit 305 measures a time. The high-frequency-change detecting unit 306 determines whether or not the viewing state of the user has changed at a high frequency, based on the information stored in the face storage unit 304.

Figure 7:
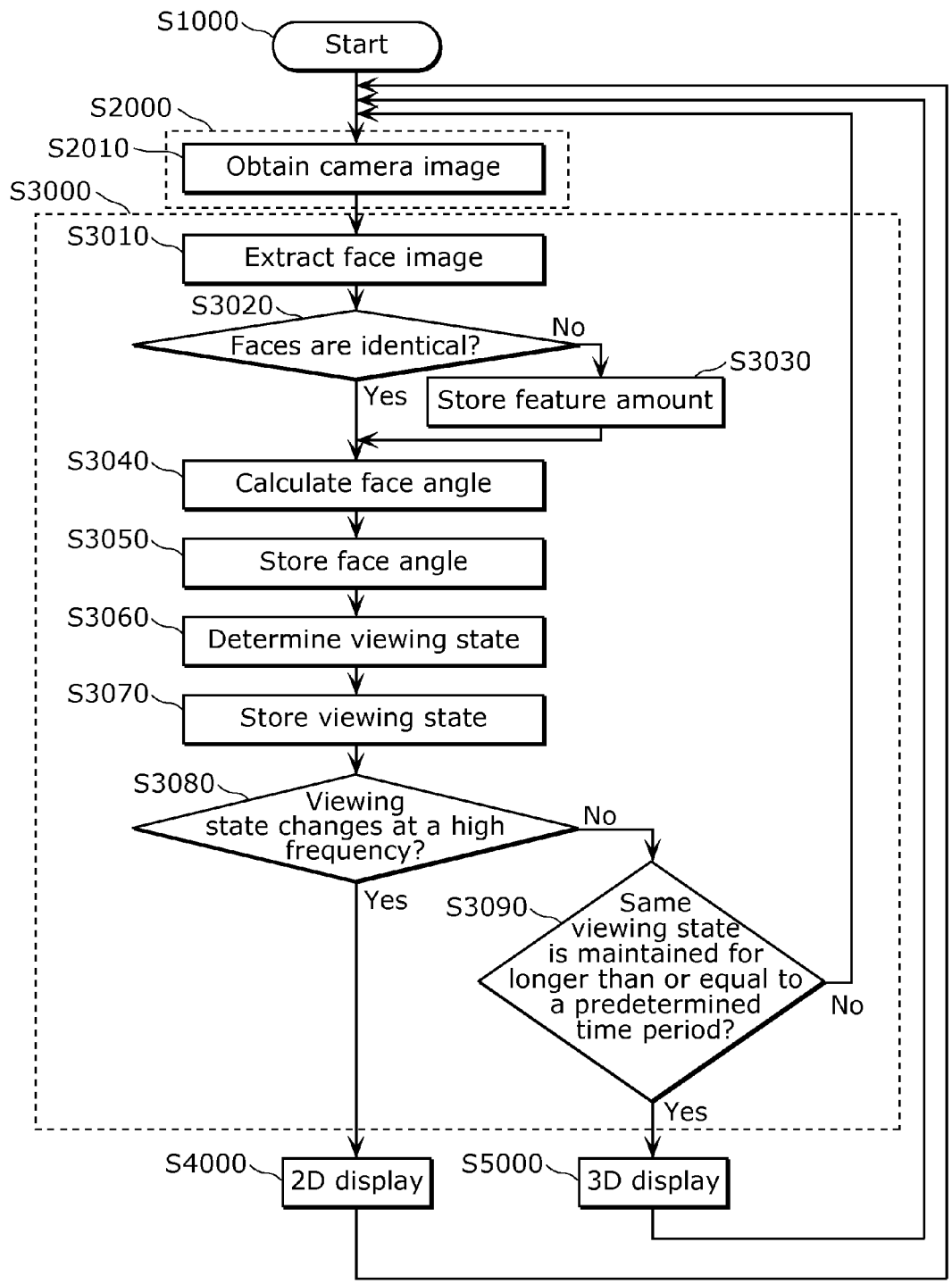
FIG. 7 is a flow chart showing an example of a detailed operation performed by the 3D video display apparatus according to Embodiment 1.

FIG. 7 is a flow chart showing in detail operations performed by the 3D video display apparatus 10 illustrated in FIG. 6. Step S2000 in FIG. 3 includes Step S2010 shown in FIG. 7 and Step S3000 in FIG. 3 includes Step S3010 to Step S3100 shown in FIG. 7. The operations same as those in FIG. 3 share the same numerical references, and thus descriptions for them will be omitted as appropriate.

The 3D video display apparatus 10 starts to operate when powered on (S1000). Next, the camera 201 captures a still image in a range at 120 degrees in horizontal directions in front of the 3D video display apparatus 10, and outputs the captured image to the face extracting unit 301 (S2010). For example, a still image is captured 10 times in one second. The face extracting unit 301 extracts a face image of a person from the image obtained in Step S2010 (S3010). As the method of extraction, a method is employed which narrows down a face region using histogram of distribution of skin color pixels as in PTL 3, for example.

The face extracting unit 301 compares a feature amount of the extracted face image with the feature amount of the face image stored in the face storage unit 304, thereby determining whether or not the face image extracted from the subject image is the same as the face image which is stored in the face storage unit 304 and on which the calculation of the feature amount is based (S3020). The face extracting unit 301, using an eigen vector obtained in advance by performing principal component analysis on a large number of face images, generates a set of weights of eigen vectors based on the difference between the inputted face image and the average vector, in the same manner as described in NPL 1, for example. The face extracting unit 301 determines whether or not the face images are identical based on the degree of similarity of the weight set.

When it is determined in Step S3020 that the face image extracted from the subject image is the same as the face image which is stored in the face storage unit 304 and on which the calculation of the feature amount is based (Yes in S3020), the operation proceeds to Step S3040. When it is determined in Step S3020 that the feature amount is not stored in the face storage unit 304 or that the face image extracted from the subject image is different from the face image which is stored in the face storage unit 304 and on which the calculation of the feature amount is based (No in S3020), the face extracting unit 301 outputs the feature amount of the face image to the face storage unit 304. The face storage unit 304 sets a new face ID, and stores: a time of obtainment of the still image from which the face image different from the prestored face image on which the calculation of the feature amount is based is extracted; and the feature amount of the face image, in association with the face ID (S3030).

The face angle calculating unit 302 calculates an angle between the face of the face image extracted by the face extracting unit 301 and the image screen of the 3D video display apparatus 10 to calculate a face angle, and outputs the face angle to the state determining unit 303 and the face storage unit 304 (S3040). The face angle calculating unit 302, when determining positions of eyes and a mouth in the face region by template matching, calculates a face angle using the best matching template among a plurality of templates of the face angle, in the same manner as described in NPL 2, for example.

The face storage unit 304 stores the time of obtainment of the subject still image and the face angle (S3050).

Figure 8:
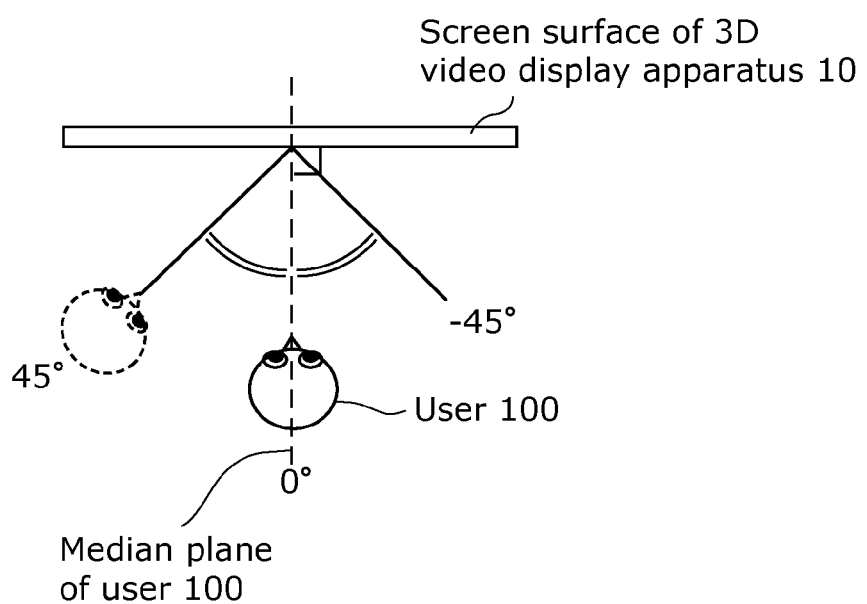
FIG. 8 is a schematic view showing an angle of the face of a user according to Embodiment 1.

The state determining unit 303 determines the state as viewing when the face angle calculated in Step S3040 falls within a predetermined angle range, and as non-viewing when the face angle falls outside the range (S3060). The predetermined angle range is, for example, a rage of which the angle between the median plane of the face and the normal line of the plane of the screen of the 3D video display apparatus 10 is from −45 degrees to 45 degrees. FIG. 8 is a schematic view illustrating a face angle determined in Step S3060. The state determining unit 303 outputs the result of determination of the viewing state to the face storage unit 304. The face storage unit 14 304 stores the viewing state determined in Step S3060 in association with the face ID and the time of obtainment of the still image from which the subject face image is extracted (S3070).

Figure 9:
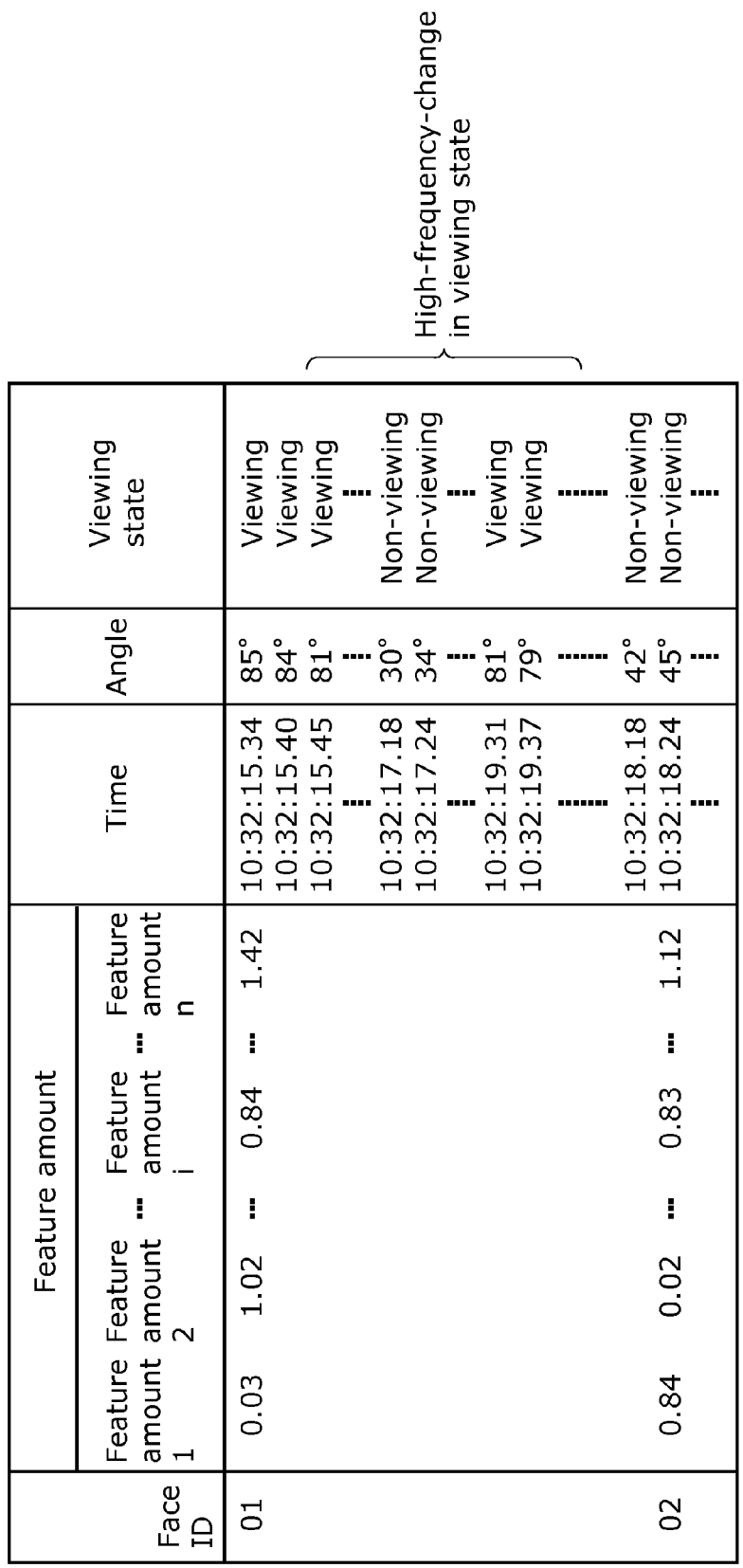
FIG. 9 is a diagram showing an example of data stored in a face storage unit according to Embodiment 1.

FIG. 9 shows an example of data stored in the face storage unit 304.

The face storage unit 304 stores the face ID, the feature amount of the face obtained in Step S3010, the time of obtainment of the still image from which the face image is extracted, the face angle obtained in Step S3040, and the viewing state determined in Step S3060.

The high-frequency-change detecting unit 306 determines whether or not the viewing state of the subject face image changes at a high frequency (S3080). The high-frequency-change detecting unit 306 extracts an information item of the latest face image from among information items of the face images stored in the face storage unit 304. In addition, the high-frequency-change detecting unit 306 extracts the face ID from the information on the subject face image, and extracts information on a face image which has the identical face ID and an image obtainment time prior to the image obtainment time of the subject image within a predetermined time period. The predetermined time period is 10 seconds, for example. The high-frequency-change detecting unit 306 obtains the number of times when a viewing state is different from the viewing state of the information stored immediately before, among information items extracted. When the viewing state is different from the state immediately before, it is indicated that the viewing state changes. When the change in the viewing state is detected at a higher frequency than a predetermined frequency, more than or equal to three times in ten seconds, for example, it is determined as high-frequency change in the viewing state. When a high-frequency change in the viewing state is detected in Step S3080, the operation proceeds to Step S4000. The image display unit 600 renders the 3D video images, which are stored in the video information storage unit 400, into 2D video images based on the 2D rendering signal outputted from the control unit 500, and displays the 2D images (S4000). When a high-frequency change in the viewing state is not detected in Step S3080, the high-frequency-change detecting unit 306 further determines whether or not the viewing state of the subject face image is maintained for longer than or equal to a predetermined time period, longer than or equal to five seconds, for example. (S3090). When it is determined in Step S3090 that the same viewing state as that of the subject face image is maintained for longer than or equal to the predetermined time period (Yes in S3090), the operation proceeds to Step S5000. The image display unit 600 displays, in three dimensions as they are, the 3D video images stored in the video information storage unit 400 (S5000). When it is determined in Step S3090 that the same viewing state as that of the subject face image is not maintained for the predetermined time period, the operation returns to Step S2010 without changing the operation of the image display unit 600. Subsequent to execution of Step S4000 or Step S5000, the operation returns to Step S2010.

The method of displaying 3D video images in two dimensions will be separately described because it differs according to the configuration of the image display unit 600 and the method of 3D display.

As described above, it is possible to render 3D video images into 2D video images, by detecting the action of alternately viewing an image screen of a given 3D video display apparatus and an image screen of another 3D video display apparatus.

More specifically, in the case where there are a plurality of 3D video display apparatuses which display 3D video images, each of the 3D video display apparatuses displays the 3D video images in two dimensions by performing rendering when there is a possibility that a user, at a high frequency, is taking an action of alternately viewing the 3D video images displayed on the respective 3D video display apparatuses.

With this, it is possible to avoid the state in which depth change frequently occurs due to frequent scene changes caused by the viewing action of the user, allowing for alleviation of user's fatigue caused by the user action.

It is to be noted that, according to the exemplary embodiment, each of the 3D video display apparatuses is provided with a camera as illustrated in FIG. 4, and whether or not the 3D video display apparatuses are viewed is determined based on the orientations of the user's face captured by the respective cameras.

In addition, in the case where the camera has a sufficiently high resolution, it is possible to extract an angle of user's eyeballs with respect to an image screen, by extracting the region of the eyeballs from the image of which a face orientation of the user is captured and estimating a line of sight. As a method of extracting a line of sight, it is possible to employ the method disclosed by NPL 3, for example.

It is to be noted that, according to the exemplary embodiment, an example in which a single camera is provided to each of the 3D video display apparatuses at the center of the upper side or the lower side in the horizontal direction is described as shown in FIG. 4. However, the camera mounted on each of the 3D video display apparatuses is a camera for detecting the face orientation of a user. The face orientation of a user may be detected using images captured by a plurality of cameras placed in the vicinity of the image screen of each of the 3D video display apparatuses.

With this, it is possible to obtain depth information through matching on parts of user's face such as eyes, a nose, and a mouth, between a plurality of images, allowing for determination of a face orientation of the user with a higher accuracy.

It is to be noted that, according to the exemplary embodiment, an example is described in which a camera is provided to each of the 3D video display apparatuses as shown in FIG. 4.

Figure 10A:
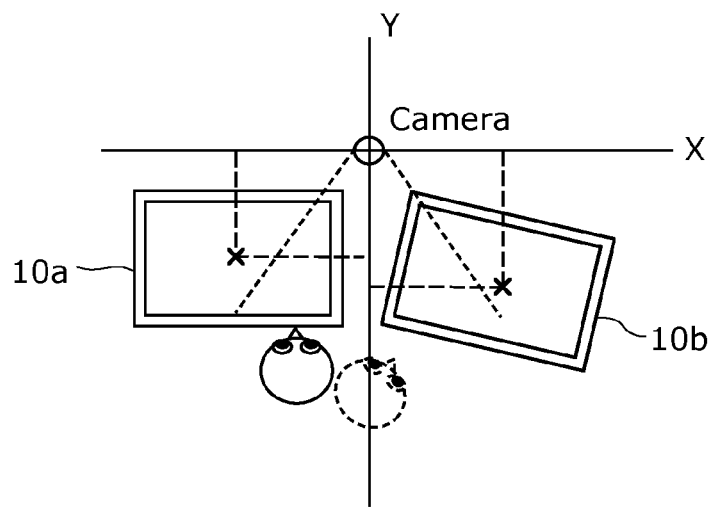
FIG. 10A is a schematic view showing an example of a state in which a user views the plural 3D video display apparatuses according to Embodiment 1.

However, the camera mounted on each of the 3D video display apparatuses is a camera for detecting the face orientation of a user. For that reason, the system may be configured by using a single camera which is shared between the 3D video display apparatuses as shown in FIG. 10A.

In this case, each of the 3D video display apparatuses stores, in advance, information on a position at which each of the 3D video display apparatuses is placed with respect to the camera.

In addition, each of the 3D video display apparatuses determines the display device viewed by a user, using video images captured by the mounted camera.

Figure 10B:
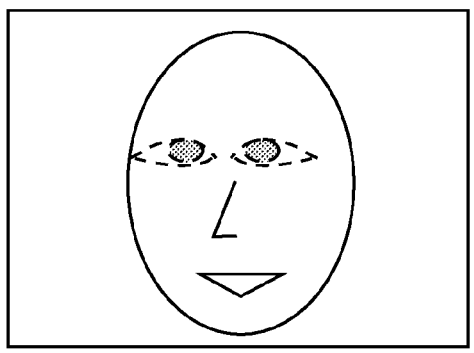
FIG. 10B is a diagram showing an example of the face image of a user who is viewing one 3D video display apparatus.
Figure 10C:
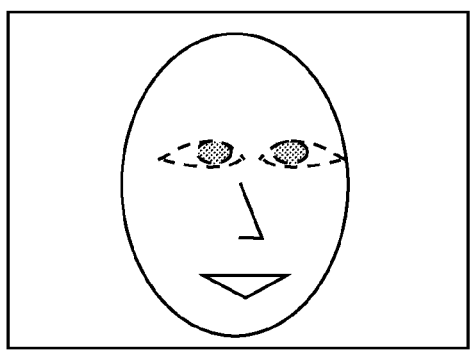
FIG. 10C is a diagram showing an example of the face image of a user who is viewing another 3D video display apparatus.
Figure 11:
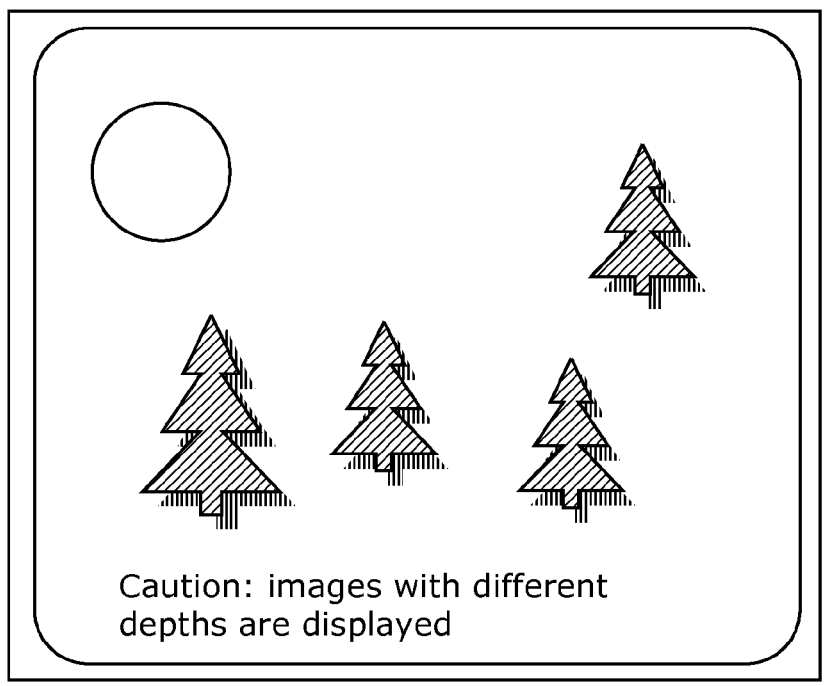
FIG. 11 is a diagram showing an example of an image screen on which an attention-drawing message is displayed.

As shown in FIG. 10B and FIG. 10C, the captured image differs depending on which of the display device the user is viewing.

In view of the above, each of the 3D video display apparatuses detects a face direction from the captured image.

It is to be noted that, the 3D video images are rendered into 2D video images when a user views the image screens on which 3D content items are displayed by switching between the image screens at a frequency higher than or equal to a predetermined frequency according to this exemplary embodiment, an attention-drawing message may be displayed on the image screen for drawing attention to warnings regarding viewing of 3D video images.

[Method of Displaying 3D Video in 2D]

Figure 12:
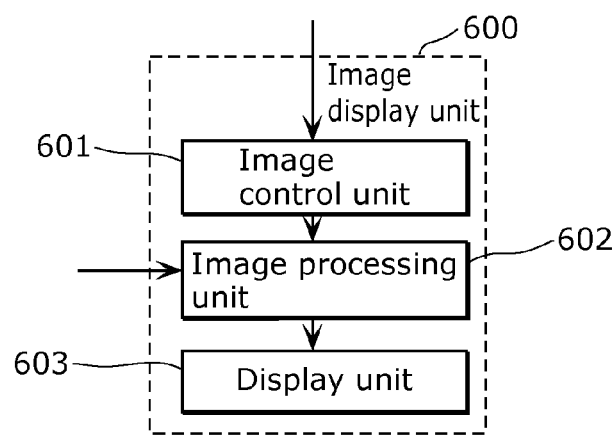
FIG. 12 is a block diagram showing an example of a configuration of an image display unit according to Embodiment 1.

FIG. 12 shows an example of the configuration of the image display unit 600 in the case where autostereoscopy is employed by the image display unit 600 as the 3D display system.

The autostereoscopy uses a barrier provided on a surface of a display or uses special lenses to adjust light directions in the horizontal direction so that a right-eye video image and a left-eye video image are viewed by the right eye and the left eye, respectively, of a user who is viewing the display.

The image display unit 600 includes an image control unit 601, an image processing unit 602, and a display unit 603.

In the case where the image display unit 600 employs the autostereoscopy display system and has a configuration as shown in FIG. 12, the image control unit 601 firstly selects one of the right-eye video image and the left-eye video image in Step S4000 shown in FIG. 3 or FIG. 7.

Next, the image processing unit 602 renders the left video image and the right video image in the 3D video images stored in the video information storage unit 400 the same.

For example, when the right-eye video image is selected, the image processing unit 602 replaces the left-eye video image with the right-eye video image in the 3D video images stored in the video information storage unit 400 to make the right-eye video image and the left-eye video image completely the same.

After performing the above 2D rendering processing, the image processing unit 602 outputs completely the same right-eye video image and left-eye video image to the display unit 603.

As in the case of 3D display, the display unit 603 splits the right-eye video image into slits and displays the slits at right-eye display positions and splits the left-eye video image into slits and displays the slits at left-eye display positions.

With this, the same video image is displayed to the left and right eyes of the user, allowing the user to view the 2D video images.

Figure 13:
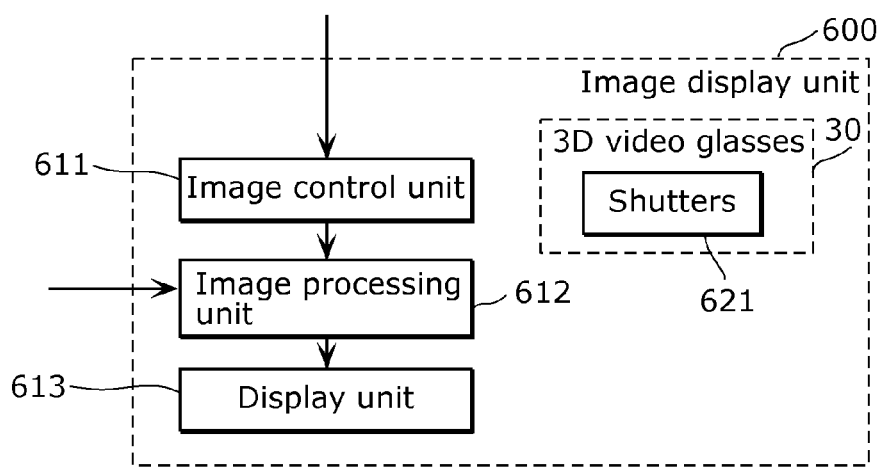
FIG. 13 is a block diagram showing an example of a configuration of the image display unit according to Embodiment 1.

FIG. 13 shows an example of the configuration of the image display unit 600 in the case where a passive system is employed by the image display unit 600 as the 3D display system.

In the passive system, a display is divided into right-eye and left-eye parts and on respective surfaces of these parts, polarization filters are provided which make different angles or directions for a right eye and a left eye.

The passive system enables 3D display with viewing through special glasses with right-eye and left-eye polarization shutters adapted for the angles or directions given by the polarization filters on the display.

The image display unit 600 includes an image control unit 611, an image processing unit 612, and a display unit 613, and further includes 3D video glasses 30 which are provided with shutters 621. In the case of the configuration as shown in FIG. 13, the image control unit 611 selects one of the right-eye video image and the left-eye video image in Step S4000 shown in FIG. 3 or FIG. 7.

The image processing unit 612 replaces the video image not selected by the image processing unit 611 with the video image selected among the right-eye video images and the left-eye video images in the 3D video images stored in the video information storage unit 400, to render the right-eye video image and the left-eye video image the same.

The image processing unit 612 outputs, to the display unit 613, the video in which the left video image and the right video image are the same.

The display unit 613 displays, in a split manner, the left video image and the right video image on respective display regions for these videos images as in the case of 3D display.

Through the shutters 621 of the worn 3D video glasses 30, the user views the video displayed on the display unit 613.

With this, the same video image is displayed to the left and right eyes of the user, allowing the user to view the 2D video image.

Figure 14:
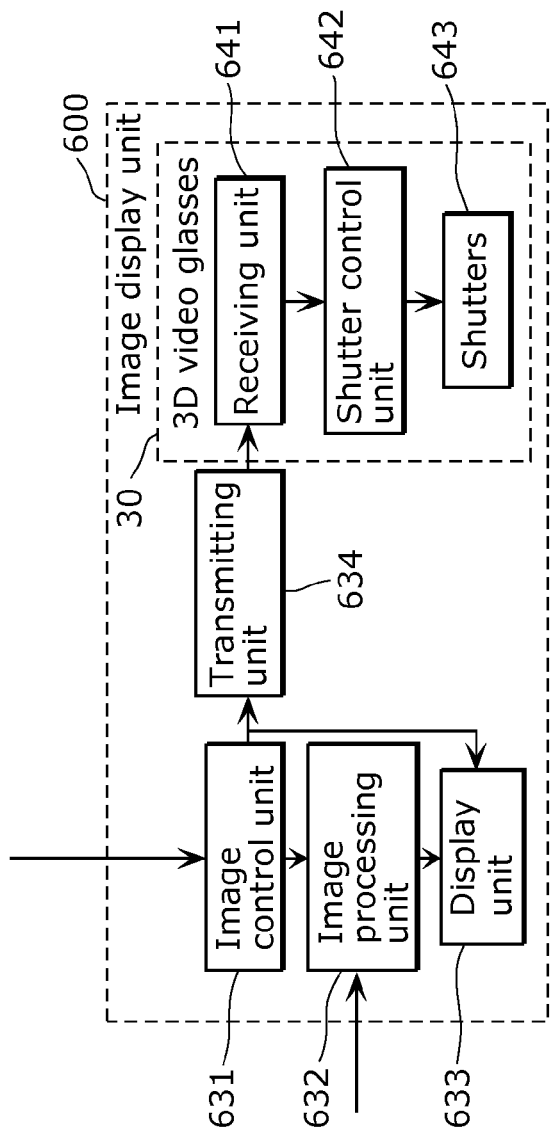
FIG. 14 is a block diagram showing an example of a configuration of the image display unit according to Embodiment 1.

FIG. 14 shows an example of the configuration of the image display unit 600 in the case where an active-shutter system is employed for the image display unit 600 as the 3D display system.

In the active-shutter system, the right-eye video image and the left-eye video image are alternately displayed on a display, and right and left shutters of special glasses are opened and closed in synchronization with the display timing.

By doing so, the user looks at the display with the right eye by opening the right-eye shutter when the right-eye image is displayed, and looks at the display with the left eye by opening the left-eye shutter when the left-eye image is displayed.

With the left video image and the right video image switched at a sufficiently high speed, the user can combine the left video image and the right video image, which achieves stereoscopic viewing.

In the case of the active-shutter system, the image display unit 600 includes: an image control unit 631; an image processing unit 632; a display unit 633; a transmitting unit 634; and 3D video glasses 30 The 3D video glasses 30 include a receiving unit 641, a shutter control unit 642, and shutters 643.

In the case of the configuration shown in FIG. 14, there are two ways to display the video images rendered in 2D in Step S4000 in FIG. 3 or FIG. 7.

The first way is performing, just as in the autostereoscopy or the passive system, the processing of video replacement by the image processing unit 632 so that the left video and the right video in the 3D video stored in the video information storage unit 400 become the same, and displaying, by the display unit 633, the left video image and the right video image which are the same, in the same or like manner as 3D video display.

The second way is as below. That is, although the image control unit 631 selects one of the right and left video images to be displayed, the display unit 633 displays the video images in the same manner or like manner as in 3D video display. Meanwhile, the image control unit 631 changes the timing of opening and closing the shutters 643 of the 3D video glasses 30 so that one of the right and left video images selected by the image control unit 631 is viewed by both eyes of the user.

In the first way, in Step S4000, the image control unit 631 selects one of the right-eye video image and the left-eye video image and the image processing unit 632 replaces the video image not selected with the video selected among the right-eye video image and the left-eye video image in the 3D video stored in the video information storage unit 400, to make the right-eye video and the left-eye video the same. The image processing unit 632 outputs, to the display unit 633, the video in which the left video image and the right video image are the same. The video control unit 631 generates, as in the case of 3D display, synchronization signals for switching the left and right shutters in synchronization with the display operation. According to the control signals outputted from the image control unit 631, the display unit 633 displays the video processed by the image processing unit 632. At the same time, the transmitting unit 634 transmits the synchronization signals generated by the image control unit 631, and the receiving unit 641 receives the synchronization signals.

The shutter control unit 642 controls the opening and closing of the shutters 643 according to the synchronization signals received by the receiving unit 641.

Since the image processing unit 632 has rendered the left video image and the right video image the same, the user will view the same video image with the right eye and the left eye in sequence, and thus will view the 2D video image.

In the second way, the image control unit 631 selects one of the right-eye video image and the left-eye video image in Step S4000. Here, assume that the right-eye video image is selected, for example.

The image control unit 631 generates synchronization signals for controlling the shutters 643 so that both the right-eye shutter and the left-eye shutter are opened when the right-eye video image is displayed and both the right-eye shutter and the left-eye shutter are closed when the left-eye video image is displayed.

Next, the image processing unit 632 outputs, to the display unit 633, without performing the 2D rendering processing on the 3D video image stored in the video information storage unit 400.

The display unit 633 alternately displays the right and left images as in the case of 3D display, and the transmitting unit 634 transmits, to the receiving unit 641, the synchronization signals generated by the image control unit 631.

The receiving unit 641 outputs the received synchronization signals to the shutter control unit 642, and the shutter control unit 642 causes the shutters 643 to open and close in synchronization based on the synchronization signals. By doing so, both of the shutters 643 of the 3D video glasses 30 worn by a user are open only when the right-eye image is displayed, and the user views the right-eye images only, allowing for 2D video image.

Embodiment 2

Figure 15:
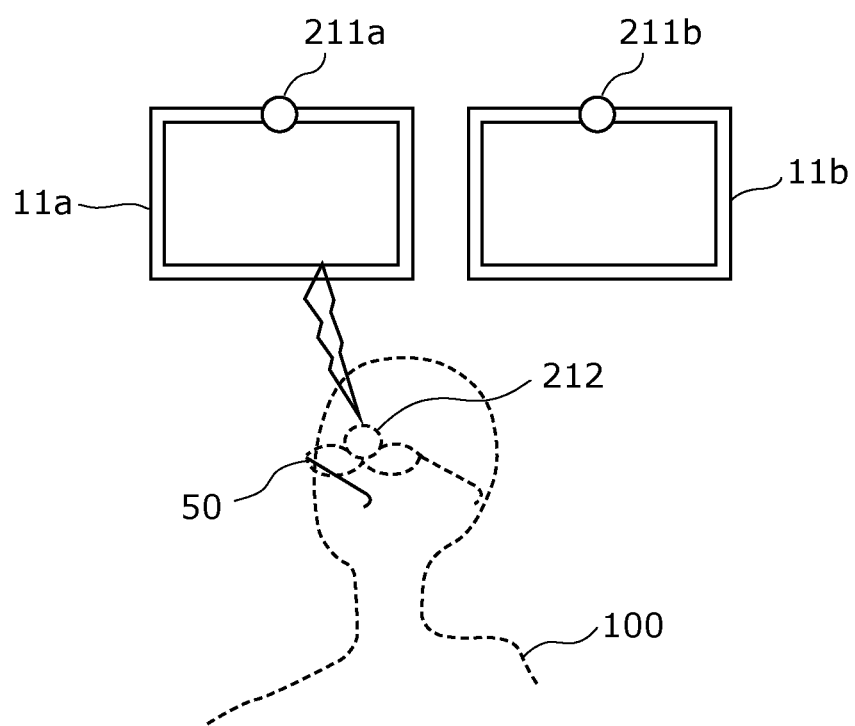
FIG. 15 is a schematic view showing an example of a state in which a user views plural 3D video display apparatuses according to Embodiment 2.

FIG. 15 is a schematic view which shows a concept of the state in which a user alternately views a plurality of 3D video display apparatuses each of which displays a different 3D video image, according to the exemplary embodiment. The plurality of 3D video display apparatuses; that is, a 3D video display apparatus 11a and a 3D video display apparatus 11b are disposed in front of a user 100, and the user 100 who wears 3D video glasses 50 can view both of the 3D video display apparatuses.

Figure 16:
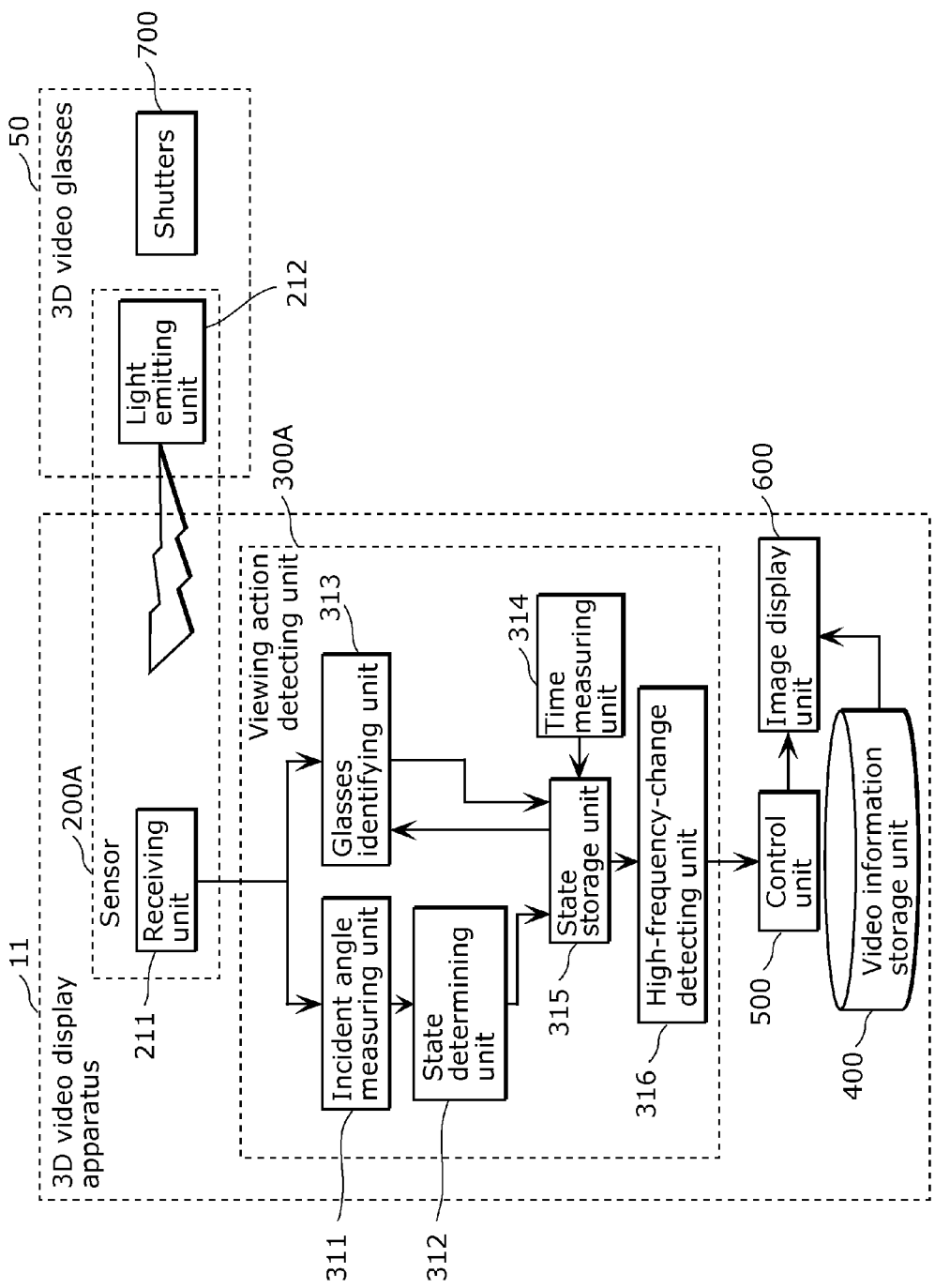
FIG. 16 is a block diagram showing an example of a configuration of the 3D video display apparatus according to Embodiment 2.

FIG. 16 illustrates an example of a detailed configuration of a 3D video display apparatus 11 having the same configuration as the configuration of the 3D video display apparatus 11a or the 3D video display apparatus 11b, and the 3D video glasses 50. The same structural elements as those of the 3D video display apparatus 10 illustrated in FIG. 1 share the same numerical references, and description will be omitted as appropriate.

The 3D video display apparatus 11 includes: a part of a sensor 200A; a viewing action detecting unit 300A; a video information storage unit 400; a control unit 500; and an image display unit 600.

The 3D video glasses 50 include a part of the sensor 200A and shutters 700.

The sensor 200A includes a light receiving unit 211 disposed in the 3D video display apparatus 11 and a light emitting unit 212 disposed in the 3D video glasses 50. The light receiving unit 211 obtains a light beam emitted by the light emitting unit 212. As illustrated in FIG. 15, the light receiving unit 211 is, for example, a camera placed at the upper center of the surface of the screen of the 3D video display apparatus 11 (light receiving units 211a and 211b), and obtains a light beam in a range at 120 degrees in a horizontal direction from the center of the screen in the horizontal direction, for example. In addition, the light emitting unit 212 is a light emitter which is placed between the right-eye shutter and the left-eye shutter of the 3D video glasses 50 as illustrated in FIG. 15, and outputs a light beam whose diffusion range is reduced toward the direction perpendicular to the surface of the shutters. The light beam is an infrared light beam, for example.

The viewing action detecting unit 300A includes: an incident angle measuring unit 311; a state determining unit 312; a glasses identifying unit 313; a state storage unit 315; a time measuring unit 314; and a high-frequency-change detecting unit 316. The incident angle measuring unit 311 calculates an incident angle, with respect to the light receiving unit 211, of a light beam which is outputted from the light emitting unit 212 and obtained by the light receiving unit 211. The state determining unit 312 determines whether or not a user is viewing the image screen of the subject 3D video display apparatus 11 based on the incident angle calculated by the incident angle measuring unit 311 in the case where the user properly wears the 3D video glasses 50. The glasses identifying unit 313 identifies the 3D video glasses 50 based on a light emitting pattern of the light emitting unit 212 obtained by the light receiving unit 211. The time measuring unit 314 measures a time. The state storage unit 315 stores: an ID of glasses for identifying the 3D video glasses identified by the glasses identifying unit 313; the light emitting pattern (pulse pattern) of the light emitting unit 212; the time measured by the time measuring unit 314; and the viewing state of the user 100 which is determined by the state determining unit 312. FIG. 17 is an example of information stored in the state storage unit 315.

Figure 18:
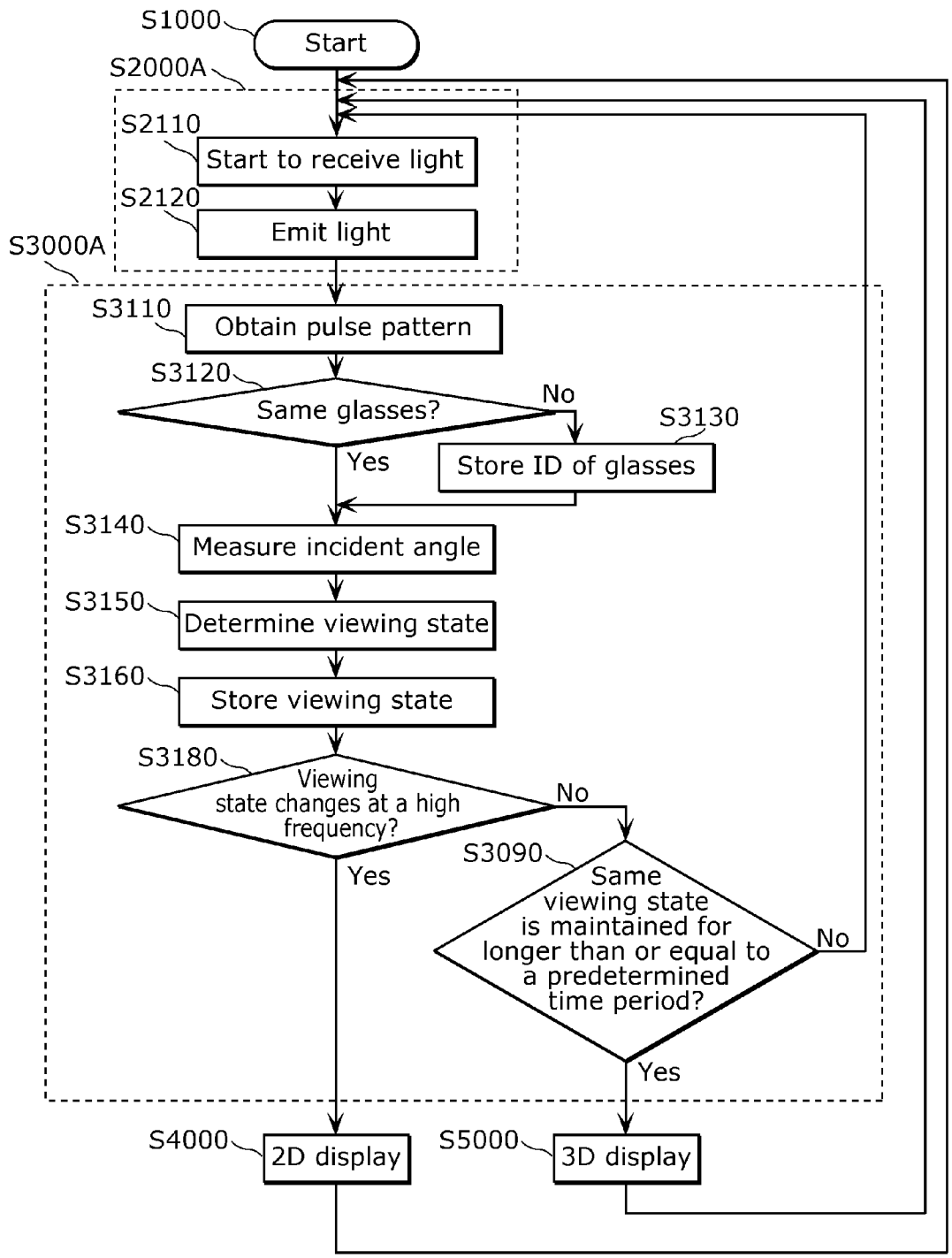
FIG. 18 is a flow chart showing an example of a detailed operation performed by the 3D video display apparatus according to Embodiment 2.

FIG. 18 is a flow chart showing operations performed by the 3D video display apparatus 11 illustrated in FIG. 16. The operations same as those performed by the 3D video display apparatus 10 illustrated in FIG. 7 of Embodiment 1 share the same numerical references, and thus descriptions for them will be omitted as appropriate.

The 3D video display apparatus 11 starts to operate when the 3D video display apparatus 11 and the 3D video glasses 50 are powered on (S1000).

The sensor 200A starts to operate and obtains information on a user state (S2000A). In other words, the light receiving unit 211 starts to receive light (S2110). Next, the light emitting unit 212 emits light (S2120). It is assumed that the light beam outputted from the light emitting unit 212 draws a precise circle of an infrared ray, for example, and is emitted according to a time pattern of a particular light emitting pulse, for example, for identifying the 3D video glasses 50. In addition, the light emitting unit 212 is assumed to diffuse light in a range of one degree in the horizontal direction when the glasses are upright with respect to the front direction of the 3D video glasses 50.

It is assumed that light is emitted 10 times in one second, for example.

The viewing action detecting unit 300A detects, based on the information on the user state obtained from the sensor 200A, a high-frequency switching action which is the state in which a user alternately views the 3D video display apparatus 11 and another 3D video display apparatus (S3000). More specifically, the glasses identifying unit 313 obtains the time pattern of the pulse of the light beam which is outputted from the light emitting unit 212 and is obtained by the light receiving unit 211 (S3110). The glasses identifying unit 313 compares the time pattern of the pulse obtained in Step S3110 with the time pattern of the pulse stored in the state storage unit 315 (S3120). When the pulse pattern obtained in Step S3110 and the pulse pattern stored in the state storage unit 315 match in Step S3120 (Yes in S3120), the operation proceeds to Step S3130. When the pulse pattern obtained in Step S3110 and the pulse pattern stored in the state storage unit 315 do not match in Step S3120, or when a pulse pattern is not stored in the state storage unit 315 (No in S3120), the state storage unit 315 sets a new ID of glasses and stores the pulse pattern and the time when the light receiving unit 211 has received the light beam, in association with the new ID of glasses (S3130).

Figure 19A:
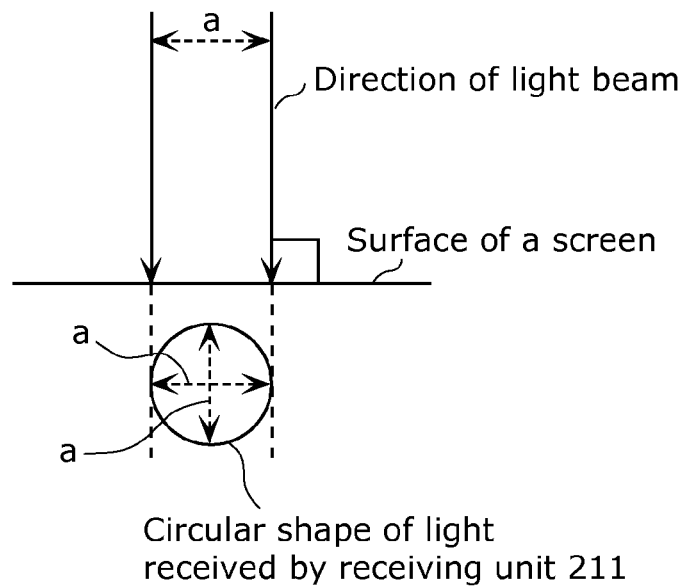
FIG. 19A is a diagram showing an example of a shape of light received by a light receiving unit in a direction perpendicular to the plane of a screen.
Figure 19B:
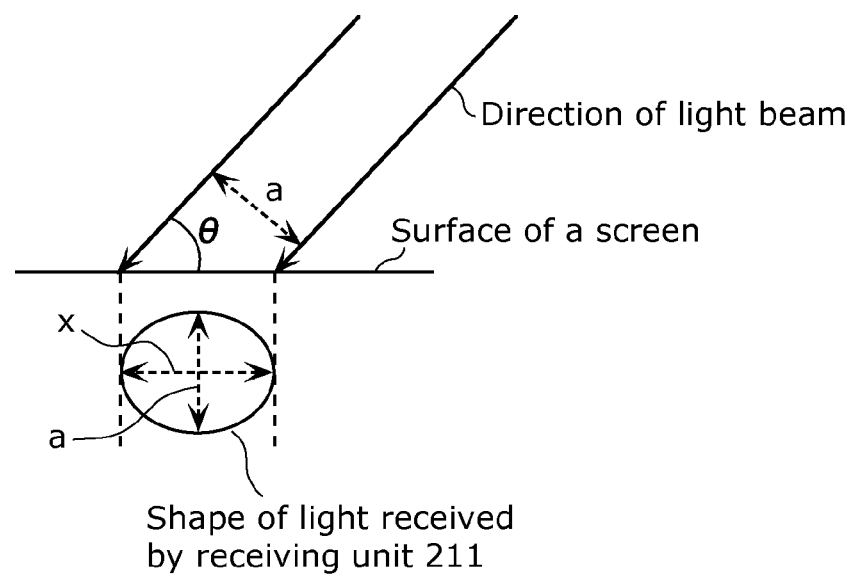
FIG. 19B is a diagram showing an example of a shape of light received by the light receiving unit in a direction of angle θ with respect to the plane of a screen.

The incident angle measuring unit 311 measures an incident angle based on a major radius and a minor radius of an oval drawn by the light beam which is outputted from the light emitting unit 212 and obtained by the light receiving unit 211 (S3140). FIG. 19A and FIG. 19B are diagrams which schematically show the relationship between (i) the incident angle which is an angle between a light receiving surface of the light receiving unit 211; that is, the surface of a screen of the 3D video display apparatus 11, and the infrared ray outputted from the light emitting unit 212, and (ii) a circle or an oval drawn on the surface of the light receiving unit 211 by the infrared ray outputted from the light receiving unit 212. FIG. 19A shows the case where the incident angle is 90 degrees and FIG. 19B shows the case where the incident angle is θ. In the case of FIG. 19A, the circle drawn on the light receiving surface of the light receiving unit 211 is a precise circle. In the case of FIG. 19B, the circle drawn on the light receiving surface of the light receiving unit 211 is an oval. The major radius of the oval is determined by the angle θ, and the incident angle θ can be obtained by Expression 1 below

[Math 1]

$$\theta = \sin^{-1}\left(\frac{a}{x}\right)$$ Expression 1

Here, a denotes the minor radius of an oval and x denotes the major radius of the oval.

It is to be noted that, according to this system configuration, the light emitting unit 212 of the 3D video glasses 50 emits an infrared ray in a circular shape, and the infrared camera or the like mounted on the 3D video display apparatus 11 measures how much the circular shape projected on the 3D video display apparatus 11 flattens. It is to be noted that the 3D video display apparatus 11 may be provided with a light emitting unit for emitting an infrared ray in a circular shape and an infrared camera so that reflection of an infrared ray projected on the 3D video glasses 50 may be detected. It is also possible to determine whether or not a user is viewing the 3D video display apparatus 11 by measuring the shape of a circle or oval of the reflection of the infrared ray reflected from the 3D video display apparatus 11.

The state determining unit 321 determines the state as viewing in the case where the incident angle calculated in Step S3140 falls within a predetermined angle range, and as non-viewing in the case where the incident angle falls outside the range (S3150). The predetermined angle range is, for example, the range between −45 degrees to 45 degrees. The state determining unit 312 outputs the result of determination of the viewing state to the state storage unit 315. The state storage unit 315 stores the viewing state determined in Step S3150 in association with the ID of glasses and the time at which the light receiving unit 211 obtains a light beam.

The high-frequency-change detecting unit 306 determines whether or not the viewing state changes at a high frequency (S3180). The high-frequency-change detecting unit 306 extracts latest information on the ID of glasses stored in the state storage unit 315. In addition, the high-frequency-change detecting unit 306 has the same ID of glasses as a most recently extracted ID of glasses, and extracts information on received light prior to the latest received light in the predetermined period of time. The predetermined time period is 10 seconds, for example. The high-frequency-change detecting unit 306 detects change in the viewing state in the extracted information. When the change in the viewing state is detected at a higher frequency than a predetermined frequency, more than or equal to three times in ten seconds, for example, it is determined as high-frequency change in the viewing state. When the high-frequency change in the viewing state is detected in Step S3180, the operation proceeds to Step S4000. The image display unit 600 displays, in two dimensions, 3D video images stored in the video information storage unit 400, based on the 2D rendering signal outputted from the control unit 500 (S4000). When the high-frequency change in the viewing state is not detected in Step S3180, the high-frequency-change detecting unit 316 further determines whether or not the viewing state of a current ID of glasses is maintained for longer than or equal to a predetermined time period, longer than or equal to five seconds, for example. (S3090). When it is determined in Step S3090 that the same viewing state of the current ID of glasses is maintained for longer than or equal to the predetermined time period (Yes in S3090), the operation proceeds to Step S5000. The image display unit 600 displays, in three dimensions, the 3D video images stored in the video information storage unit 400 (S5000). When it is determined in Step S3090 that the same viewing state as that of a current received light is not maintained for the predetermined time period, the operation returns to Step S2010 without changing the operation of the image display unit 600. Subsequent to execution of Step S4000 or Step S5000, the operation returns to Step S2010.

As described above, when there are a plurality of 3D video display apparatuses which display 3D video images, and a user alternately views, at a high frequency, the 3D video images displayed on the respective 3D video display apparatuses, it is possible to avoid the state in which depth change frequently occurs due to frequent scene change caused by the viewing action of the user, by rendering a 3D video image into a 2D video image and display the rendered video image, thereby making it possible to alleviate user's fatigue caused by the user action.

Embodiment 3

Figure 20:
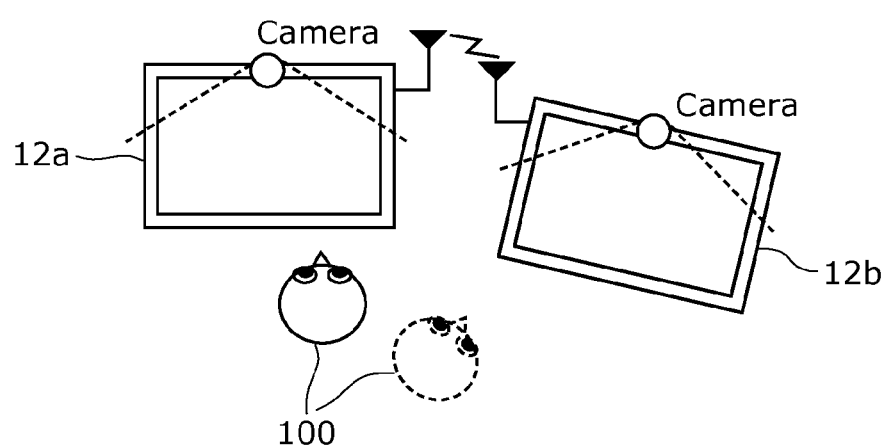
FIG. 20 is a schematic view showing an example of a state in which a user views 3D video display apparatuses according to Embodiment 3.

FIG. 20 is a schematic view which shows a concept of the state in which a user alternately views a plurality of 3D video display apparatuses each of which displays a different 3D video image, according to the exemplary embodiment. The plurality of 3D video display apparatuses; that is, a 3D video display apparatus 12a and a 3D video display apparatus 12b are disposed in front of a user 100, and the user 100 can view both of the 3D video display apparatuses. In addition, the 3D video display apparatuses can mutually perform data communication.

Figure 21:
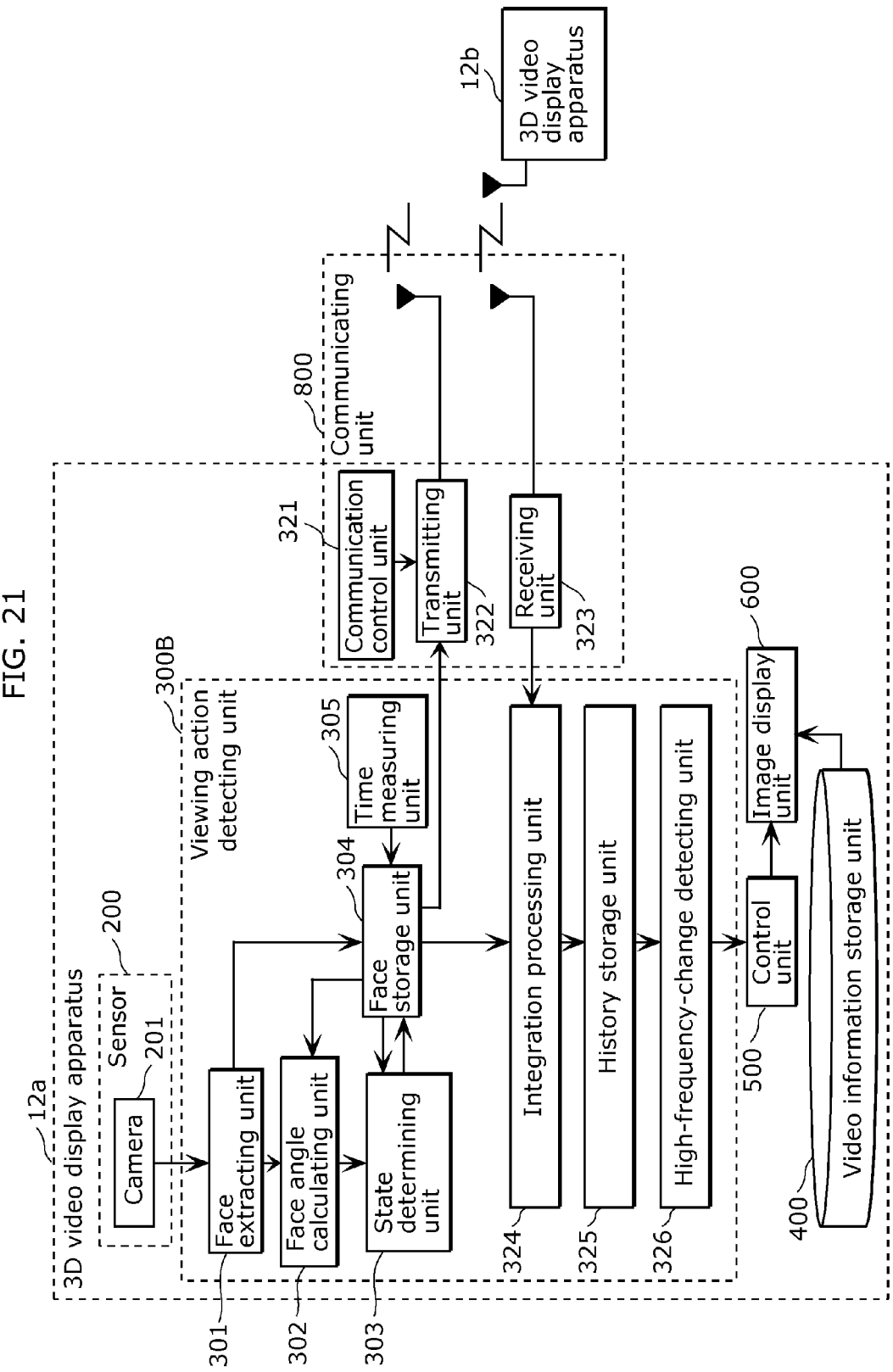
FIG. 21 is a block diagram showing an example of a configuration of the 3D video display apparatus according to Embodiment 3.

FIG. 21 illustrates an example of detailed configuration of the 3D video display apparatus 12a illustrated in FIG. 20. The structural elements same as those in FIG. 6 share the same numerical references, and descriptions for them will be omitted as appropriate. The 3D video display apparatus 12b has the same configuration as that of the 3D video display apparatus 12a.

The 3D video display apparatus 12a has a configuration including: a communicating unit 800 in addition to the configuration of the 3D video display apparatus 10 illustrated in FIG. 6, and a viewing action detecting unit 300B in place of the viewing action detecting unit 300. The communicating unit 800 includes a communication control unit 321, a transmitting unit 322; and a receiving unit 323. The communicating unit 800 transmits and receives a signal by radio or the like, between the subject 3D video display apparatus 12a and another neighboring 3D video display apparatus 12b.

The viewing action detecting unit 300B has a configuration including an integration processing unit 324 and a history storage unit 325 in addition to the configuration of the viewing action detecting unit 300 illustrated in FIG. 6, and a high-frequency-change detecting unit 326 in place of the high-frequency-change detecting unit 306. More specifically, the viewing action detecting unit 300B includes: the face extracting unit 301; the face angle calculating unit 302; the state determining unit 303; the face storage unit 304; the time measuring unit 305; the integration processing unit 324; the history storage unit 325; and the high-frequency-change detecting unit 326.

The sensor 200 includes the camera 201.

The communication control unit 321 outputs a control signal which controls transmission of information from the subject 3D video display apparatus 12a to the other 3D video display apparatus 12b. The transmitting unit 322 converts information stored in the face storage unit 304 into a signal according to the control signal outputted from the communication control unit 321, and transmits the signal to the neighboring 3D video display apparatus 12b. The receiving unit 323 receives the signal transmitted from the neighboring 3D video display apparatus 12b.

The integration processing unit 324 obtains information on a face viewing the neighboring 3D video display apparatus 12b from the signal received from the receiving unit 323 to perform matching check with a face information item stored in the face storage unit 304, and integrates results of the matching check for the respective stored faces as history of the viewing state. The history storage unit 325 stores the history of the viewing state of the respective stored faces, which is generated by the integration processing unit 324. The high-frequency-change detecting unit 326 determines, based on the information stored in the history storage unit 325, whether or not a user alternately views the subject 3D video display apparatus 12a and the neighboring 3D video display apparatus 12b and switches, at a high frequency, between the 3D video display apparatuses to be viewed.

Figure 22:
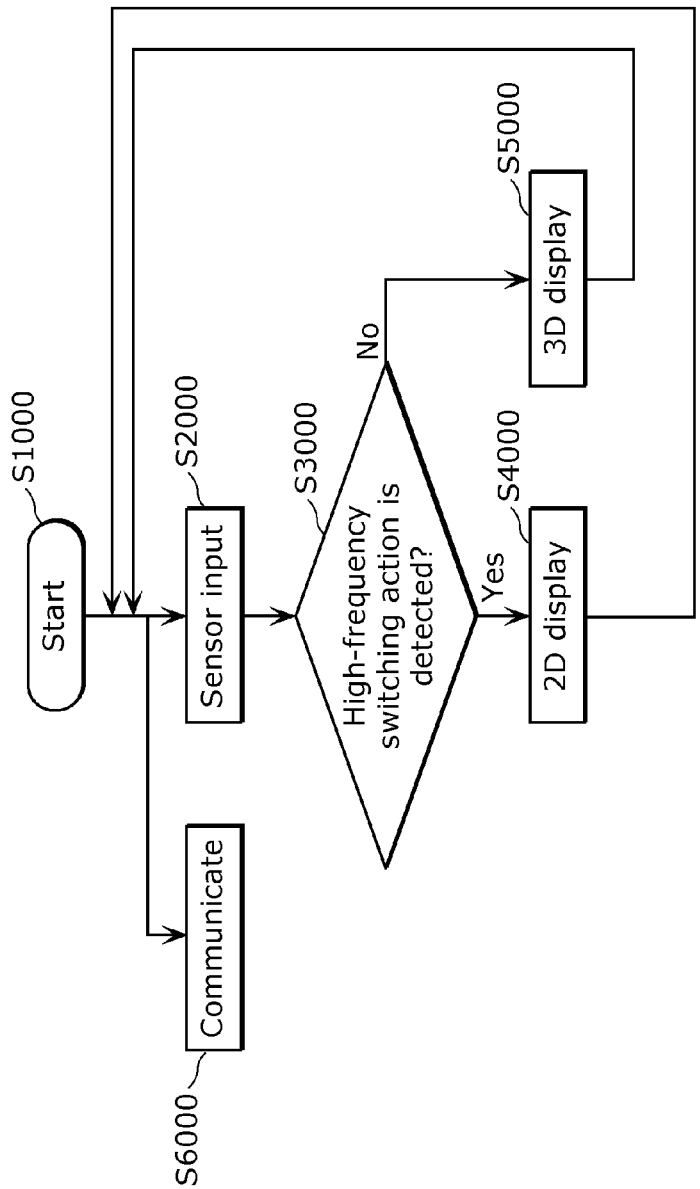
FIG. 22 is a flow chart showing an example of operations performed by the 3D video display apparatus according to Embodiment 3.

FIG. 22 is a flow chart showing operations performed by the 3D video display apparatus 12a illustrated in FIG. 21. The operations performed by the 3D video display apparatus 12a illustrated in FIG. 21 include Step S6000 in addition to the operations performed by the 3D video display apparatus 10 according to Embodiment 1 illustrated in FIG. 3. Descriptions for the operations same as those in FIG. 1 will be omitted as appropriate. The following describes the operations performed by the 3D video display apparatus 12a according to Embodiment 3 with reference to FIG. 22.

The 3D video display apparatus 12a starts to operate when powered on (S1000). Next, the sensor 200 obtains information on a user state (S2000). Meanwhile, the communicating unit 800 starts to receive a signal transmitted from another 3D video display apparatus 12b which neighbors the subject 3D video display apparatus 12a (S6000). The viewing action detecting unit 300B detects, based on the information on the user state obtained from the sensor 200 and information on user's action transmitted from the neighboring 3D video display apparatus 12b which is obtained in Step S6000, a high-frequency switching action which is the state in which the user alternately views the subject 3D video display apparatus 12a and the neighboring 3D video display apparatus 12b (S3000) When the high-frequency switching action of the user is detected in Step S3000 (Yes in S3000), the control unit 500 outputs a control signal for displaying a video image in two dimensions on the image display unit 600; that is, a two-dimensional (2D) rendering signal. The image display unit 600 renders 3D video images stored in the video information storage unit 400 into 2D video images based on the 2D rendering signal, and displays the 2D video images (S4000). When the high-frequency switching action of the use is not detected in Step S3000 (No in S3000), the image display unit 600 displays, in three dimensions as they are, the 3D video images stored in the video information storage unit 400 (S5000). After executing Step S4000 and Step S5000, the operation returns to Step S2000 and repeats execution from Step 2000 to Step S4000 or Step S5000.

Figure 23:
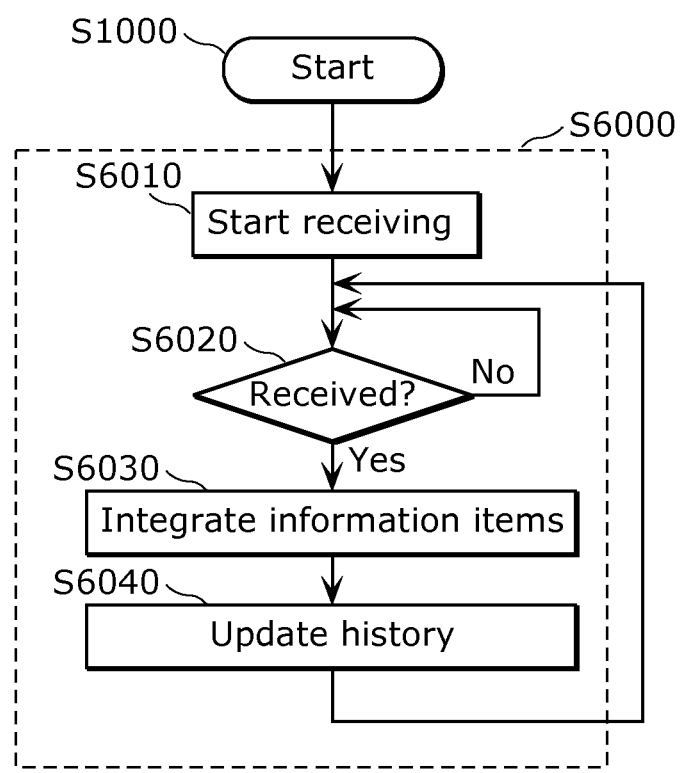
FIG. 23 is a flow chart showing an example of part of operations performed by the 3D video display apparatus according to Embodiment 3.

FIG. 23 is a flow chart showing part of the detailed operations performed by the 3D video display apparatus 12a illustrated in FIG. 21. Step S6000 is operated independently of the operational flow from Step S2000 to Step S5000. The following describes the detailed operations in Step S6000 with reference to FIG. 23.

Figure 24:
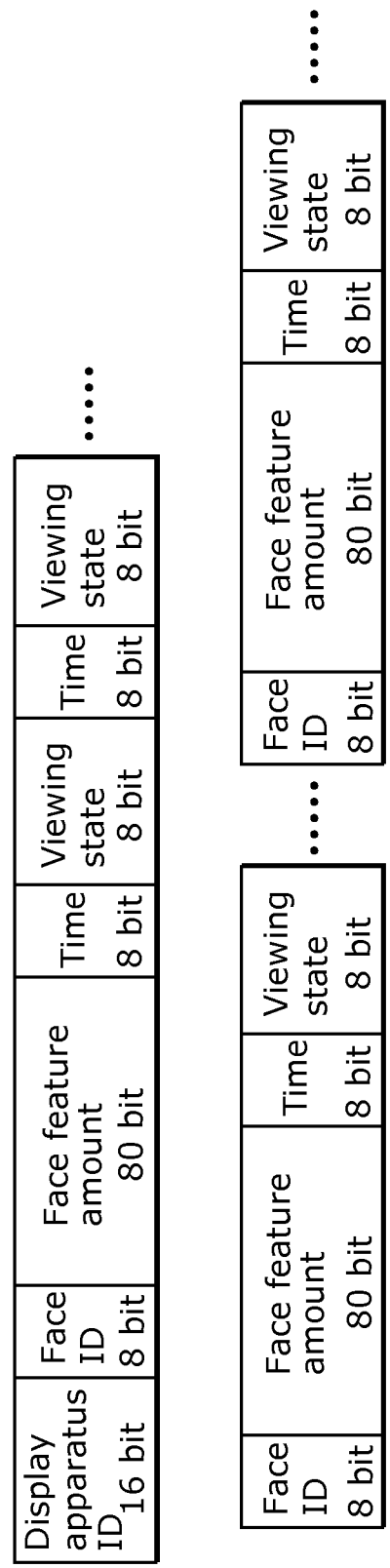
FIG. 24 is a diagram showing an example of a configuration of a signal communicated by a communicating unit according to Embodiment 3.

The 3D video display apparatus 12a starts to operate in Step S1000. The receiving unit 323 starts receiving operation (S6010). The signal received by the receiving unit 323 is communicated by, for example, radio communication such as Bluetooth (registered trademark). The signal includes, from the top, information items such as: an display apparatus ID for identifying the 3D video display apparatus 12b; a face ID and feature amount for identifying a face that has been sensed by the 3D video display apparatus 12b which transmits the signal; a time at which the face is sensed, and a viewing state which shows whether or not the user was viewing, at the time when the face was sensed, the 3D video display apparatus 12b which transmitted the signal, as illustrated in FIG. 24. When the 3D video display apparatus 12b, which is the source of transmission, senses a plurality of faces, information items on the plurality of faces are transmitted. The receiving unit 323 waits for a radio signal of which the signal format matches (S6020). When the signal is received in Step S6020 (Yes in S6020), the receiving unit 323 outputs the information included in the received signal to the integration processing unit 324, and the operation proceeds to Step S6030. Step S6020 will be repeated when the signal is not received in Step S6020 (No in S6020).

In Step S6030, the integration processing unit 324 integrates (i) the information on the state of the face stored in the 3D video display apparatus 12b neighboring the subject 3D video display apparatus 12a, which is included in the signal received by the receiving unit 323 in Step S6020, and (ii) the information on the state of the face stored in the face storage unit 304 of the subject 3D video display apparatus 12a (S6030), and stores the integrated information into the history storage unit 325 (S6040). Subsequent to Step S6040, the operation returns to Step S6020. The 3D video display apparatus 12a repeats operations from Step S6020 to Step S6040, thereby generating and storing history of the viewing state of the user via communication with the neighboring 3D video display apparatus 12b.

Figure 25:
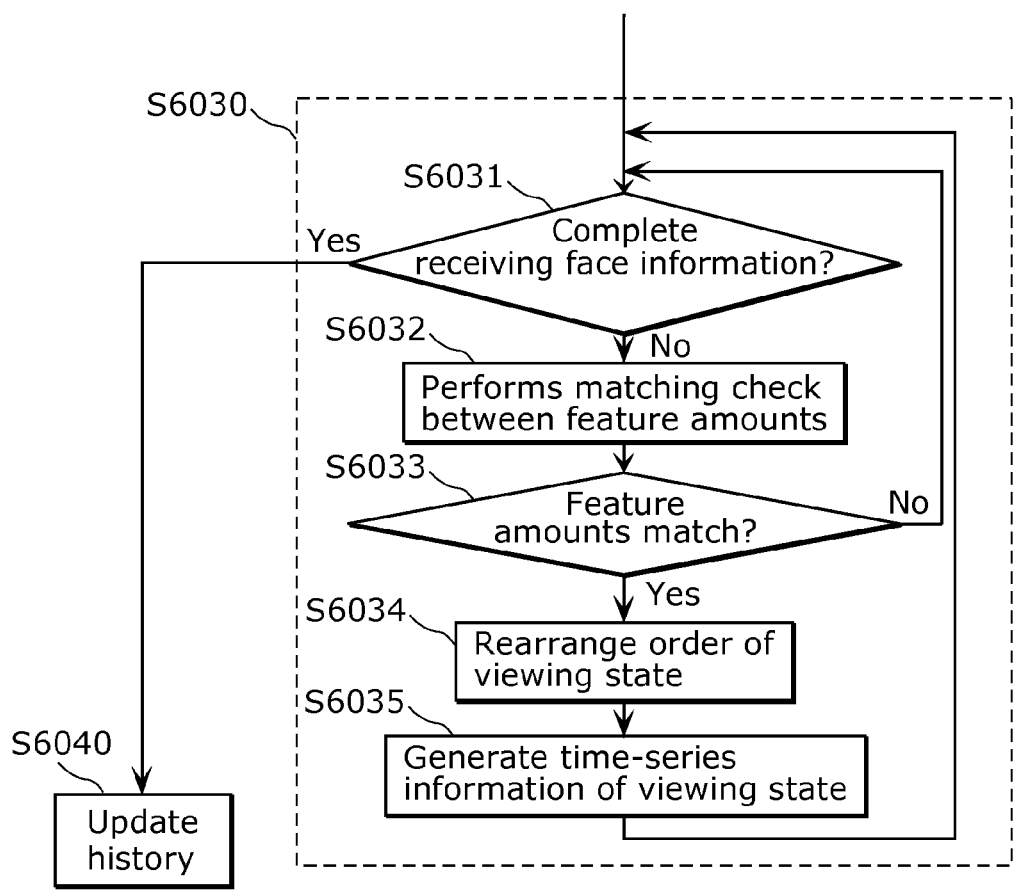
FIG. 25 is a flow chart showing an example of part of operations performed by the 3D video display apparatus according to Embodiment 3.

FIG. 25 is a flow chart illustrating details of the operations performed by the integration processing unit 324 in Step S6030. In Step S6030, the integration processing unit 324 extracts an unprocessed face information item using the face information item received in Step S6020 (S6031). When an unprocessed face information item is not present in Step S6031 (Yes in S6031), the operation proceeds to Step S6040. When an unprocessed face information item is present in Step S6031 (No in S6031), the integration processing unit 324 performs matching check between the feature amount of the unprocessed face stored in the neighboring 3D video display apparatus 12b which is extracted in Step S6031 and the feature amount of all of the faces stored in the face storage unit 304 (S6032), and extracts the face information item of which the feature amount matches from the face storage unit 304 (S6033) The matching check is performed in the same manner as in Step S3020 of Embodiment 1, for example. When it is determined that the face information item of which the face feature amount matches is stored in the face storage unit 304 (Yes in S6033), the operation proceeds to Step S6034. When it is determined that the face information item of which the face feature amount matches is not stored in the face storage unit 304 (NO in S6033), the operation returns to Step S6031. The state in which the face information item of which the face feature amount matches is not stored in the face storage unit 304 in Step S6033 indicates that the user identified by the face feature amount on which match checking is performed is viewing the neighboring 3D video display apparatus 12b which is the source of the transmission of the face information item but is not viewing the subject 3D video display apparatus 12a. It is therefore unnecessary to perform the processing for alleviating fatigue caused by the subject 3D video display apparatus 12a.

In Step S6034, the integration processing unit 324 rearranges, according to the time, the order of the viewing state in each time of the face information item which is stored in the face storage unit 340 and extracted in Step S6033 (whether or not the subject 3D video display apparatus 12a is viewed) and the viewing state in each time of the face information item whose feature amount is determined as matching in Step S6033 among the received face information items (whether or not the neighboring 3D video display apparatus 12b is viewed) (S6034). In addition, the integration processing unit 324 generates, for the face information on which the order rearrangement has been performed in Step S6034, data in which the face ID stored in the face storage unit 340 of the subject 3D video display apparatus 12a, the display apparatus ID of the 3D video display apparatus 12b which is the transmission source, the face ID which has been set in the 3D video display apparatus 12b which is the transmission source, and the viewing information indicating which of the 3D video display apparatuses is viewed, are associated with the time at which the face information item is obtained, and outputs the generated data to the history storage unit 325 (S6035). The history storage unit 325 stores the data generated in Step S6035 (S6040).

FIG. 26 shows an example of data stored in the history storage unit 325. The history storage unit 325 stores, for the face information item stored in the face storage unit 304 of the subject 3D video display apparatus 12a, the face ID for identifying a face, the face ID of a face identified by the neighboring 3D video display apparatus 12b, and the viewing state indicating which of the 3D video display apparatuses is viewed, for each time. For example, the first row indicates that the face of the face ID "01" is extracted by the subject 3D video display apparatus 12a and the neighboring 3D video display apparatus 12b having the apparatus ID "neighboring 1". It is indicated that the face of the face ID "01" is viewing the subject 3D video display apparatus 12a at the time of "10:32:15.55" (1), and not viewing the 3D video display apparatus 12b having the apparatus ID "neighboring 1" or "neighboring 2" (0).

It is to be noted that, here, the integration processing unit 324 integrates the items of viewing state information of the face only from the information obtained from the receiving unit 323 and the information stored in the face storage unit 304. However, the items of viewing state information may be integrated using the association between the face ID of the subject 3D video display apparatus 12a stored in the history storage unit 325 and the face ID of the neighboring 3D video display apparatus 12b.

In addition, here, the integration processing unit 324 performs matching check between the received face information item and all of the information items stored in the face storage unit 304, however, the matching check may be performed only with the information temporally subsequent to the time stored in the history storage unit 325, by referring to the history storage unit 325.

It is to be noted that, two apparatuses are illustrated here as the 3D video display apparatuses which are positioned close to each other in FIG. 20 and FIG. 21 for the sake of simplicity, however, the same processes are performed also in the case where three or more apparatuses are positioned close to each other and a user alternately views three or more 3D video images.

Step S3000 in FIG. 22 includes Step S3010 to Step S3090 of Embodiment 1 illustrated in FIG. 7, however, only the operation of Step S3080 differs from that of Embodiment 1 and thus will be described.

The high-frequency-change detecting unit 326 determines whether or not at least one viewing state of a face stored in the history storage unit 325 changes at a high frequency (S3080).

The high-frequency-change detecting unit 326 extracts, from the history storage unit 325, a face information item including a time prior to the current time in a predetermined time period. The predetermined time period is 10 seconds, for example. When switching of the 3D video display apparatuses which is viewed is detected at a higher frequency than a predetermined frequency, more than or equal to three times in ten seconds, for example, among the extracted information items, it is determined as a high-frequency change in the viewing state. However, the case is excluded where the time when none of the 3D video display apparatuses is viewed is included for a predetermined amount of time or longer. The predetermined time period is three seconds, for example. When the high-frequency change in the viewing state is detected in Step S3080, the operation proceeds to Step S4000. When the high-frequency change in the viewing state is not detected in Step S3080, the operation proceeds to Step S3090.

As described above, in the case where there are a plurality of 3D video display apparatuses which display 3D video images and are located in the vicinity, the 3D video display apparatuses communicate with each other, accurately detect the state in which a user alternately views 3D video images each displayed on a different one of the 3D video display apparatuses at a high frequency, and render the 3D video images into 2D video images to be displayed. With this, it is possible to avoid only the state which produces fatigue and in which depth change frequently occurs due to frequent scene change caused by user's viewing action of alternately viewing the 3D video images, without performing the processing in such a case with smaller strain as alternately viewing an video image and a real space, thereby allowing for alleviation of user's fatigue caused by the user action.

Embodiment 4

In this exemplary embodiment, 3D video glasses are used as in FIG. 15 of Embodiment 2, a plurality of 3D video display apparatuses for viewing 3D video images are located in the vicinity, and a user 100 who wears the 3D video glasses can alternately view 3D video images each of which is independently displayed on different one of the plurality of 3D video display apparatuses. According to Embodiment 4, the plurality of 3D video display apparatuses are further capable of mutually performing data communication in addition to the state in Embodiment 2.

Figure 27:
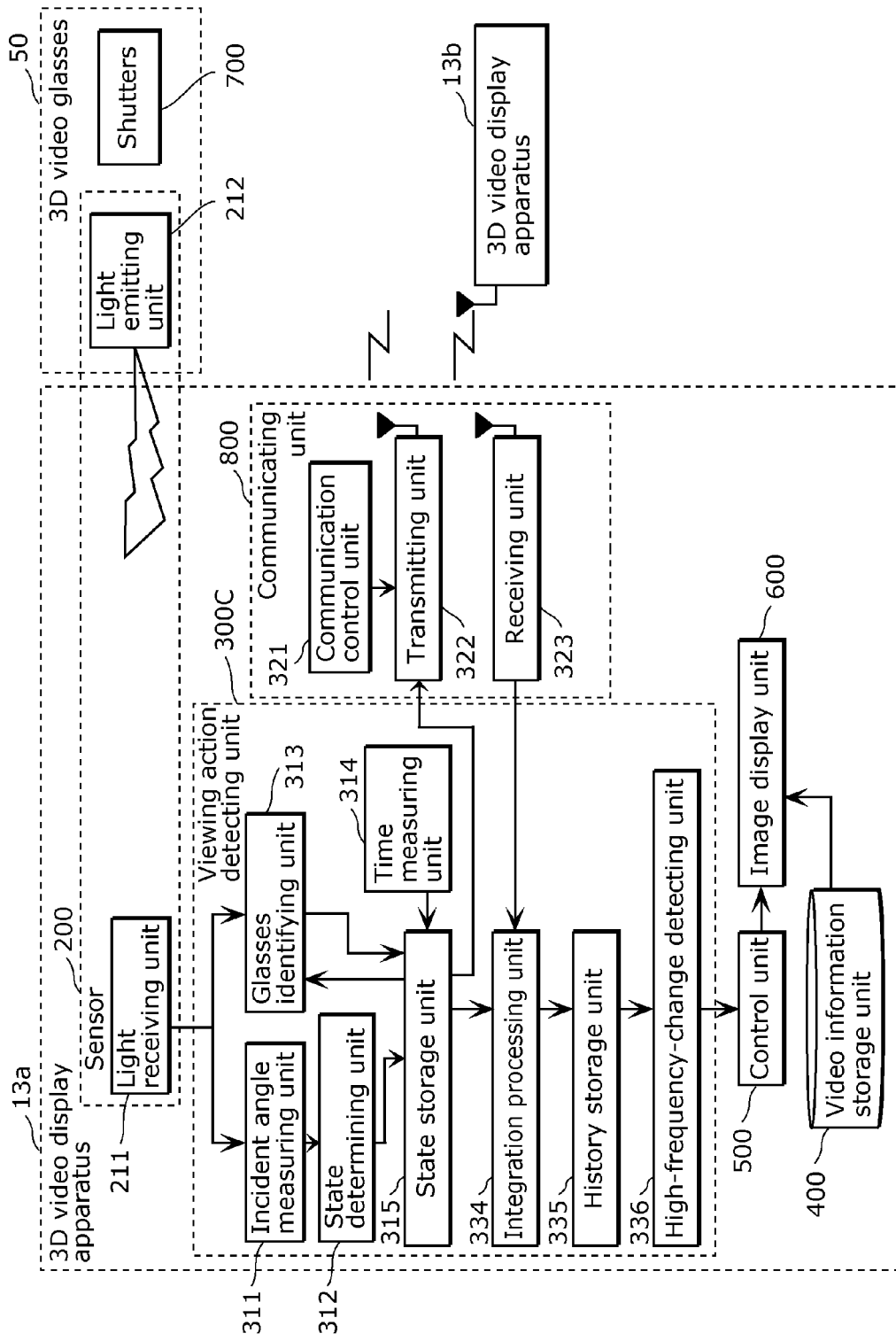
FIG. 27 is a block diagram showing an example of a configuration of the 3D video display apparatus according to Embodiment 4.

FIG. 27 illustrates an example of detailed configuration of the 3D video display apparatus 13 of Embodiment 4. The 3D video display apparatus 13a has a configuration including: a communication unit 800 illustrated in FIG. 21 in addition to the configuration of the 3D video display apparatus 11 illustrated in FIG. 16; and a viewing action detecting unit 300C in place of the viewing action detecting unit 300A.

The viewing action detecting unit 300C has a configuration including an integration processing unit 334 and a history storage unit 335 in addition to the configuration of the viewing action detecting unit 300A, and a high-frequency-change detecting unit 336 in place of the high-frequency-change detecting unit 316.

The communicating unit 800 transmits and receives a signal by radio or the like, between the subject 3D video display apparatus 13a and another neighboring 3D video display apparatus 13b. The structural elements same as those in FIG. 16 and FIG. 21 share the same numerical references, and descriptions for them will be omitted as appropriate. The 3D video display apparatus 13b has the same configuration as that of the 3D video display apparatus 13a.

The 3D video display apparatus 13a includes: a part of the sensor 200; a viewing action detecting unit 300C; the video information storage unit 400; the control unit 500; the image display unit 600; and the communicate unit 800.

The 3D video glasses 50 include a part of the sensor 200 and shutters 700.

The sensor 200 includes the light receiving unit 211 disposed in the 3D video display apparatus 13a and the light emitting unit 212 disposed in the 3D video glasses 50.

The viewing action detecting unit 300C includes: the incident angle measuring unit 311; the state determining unit 312; the glasses identifying unit 313; the state storage unit 315; the time measuring unit 314; the integration processing unit 334; the history storage unit 335; and a high-frequency-change detecting unit 336. The incident angle measuring unit 311 calculates an angle of a light beam of the light emitting unit 212 which enters the light receiving unit 211. The state determining unit 312 determines whether or not a user is viewing the image screen of the subject 3D video display apparatus 13a based on the incident angle calculated by the incident angle measuring unit 311 in the case where the user properly wears the 3D video glasses 50. The glasses identifying unit 313 identifies the 3D video glasses 50 based on a light emitting pattern of the light emitting unit 212 obtained by the light receiving unit 211. The time measuring unit 314 measures a time. The state storage unit 315 stores: an ID of glasses for identifying the 3D video glasses identified by the glasses identifying unit 313; the time measured by the time measuring unit 314; and the viewing state of the user 100 which is determined by the state determining unit 312. The communication control unit 321 outputs a control signal for controlling transmission of information. The transmitting unit 322 converts information stored in the state storage unit 315 into a signal according to the control signal outputted from the communication control unit 321, and transmits the signal to the neighboring 3D video display apparatus 13b. The receiving unit 323 receives the signal transmitted from the neighboring 3D video display apparatus 13b.

The integration processing unit 334 obtains information on the user who views the neighboring 3D video display apparatus 13b and the 3D video glasses 50 from the signal received from the receiving unit 323, performs matching check with the information stored in the state storage unit 315, and integrates the result of the matching check for each of the user and the 3D video glasses 50, as history of the viewing state. The history storage unit 335 stores the history of the viewing state for each of the user and the 3D video glasses 50, which is generated by the integration processing unit 334. The high-frequency-change detecting unit 336 determines, based on the information stored in the history storage unit 335, whether or not the user alternately views the subject 3D video display apparatus 13a and the neighboring 3D video display apparatus 13b and switches the 3D video display apparatuses to be viewed at a high frequency.

Figure 28:
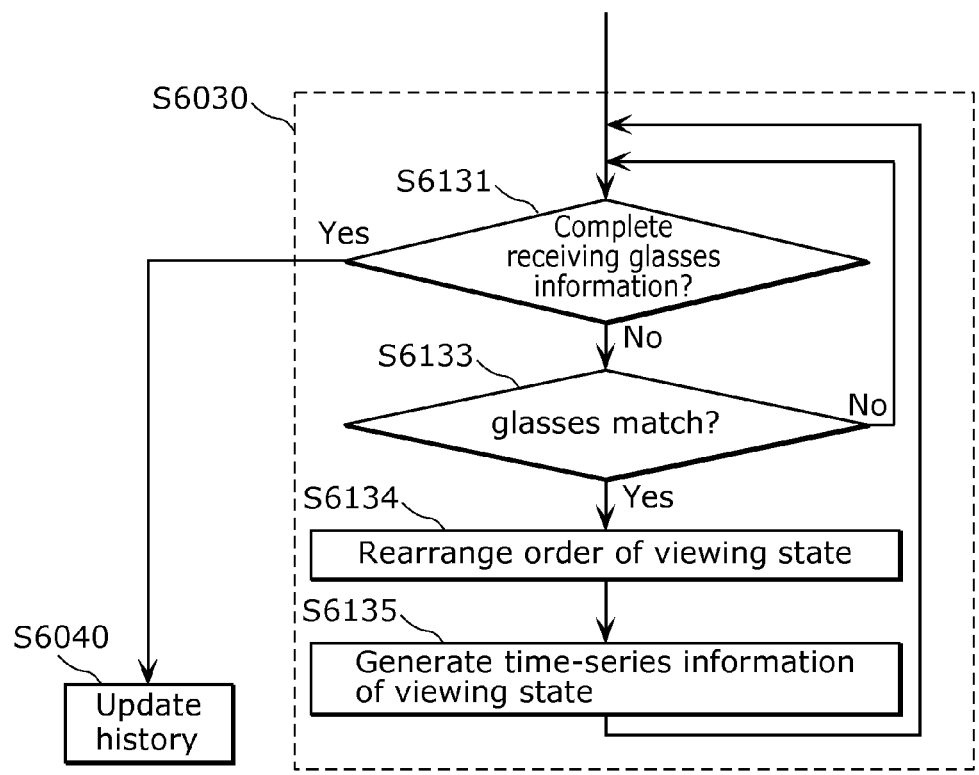
FIG. 28 is a flow chart showing an example of part of operations performed by the 3D video display apparatus according to Embodiment 4.

FIG. 28 is a flow chart showing part of the operations performed by the 3D video display apparatus 13a illustrated in FIG. 27. The operations performed by the 3D video display apparatus 13a are the same as those of Steps S1000, S2000, S4000, S5000, and S6000 of Embodiment 3 illustrated in FIG. 22 and FIG. 23. However, the operation in S6030 is partially different. The following describes detailed operations in Step S6000 with reference to FIG. 28, FIG. 22, and FIG. 23. The same portions as those in FIG. 25 of Embodiment 3 share the same numerical references, and description for them will be omitted as appropriate.

Figure 29:
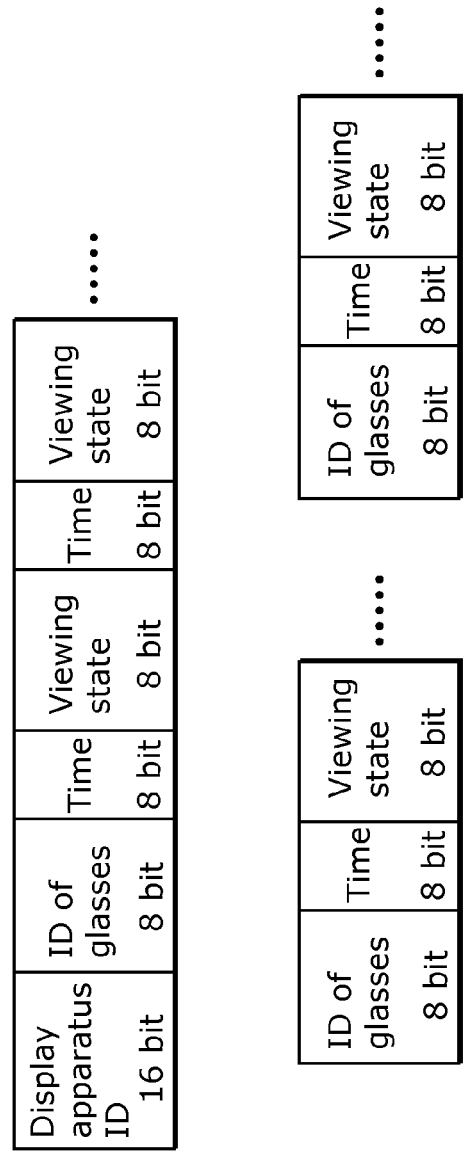
FIG. 29 is a diagram showing an example of a configuration of a signal communicated by a communicating unit according to Embodiment 4.

The 3D video display apparatus 13a starts to operate in Step S1000 illustrated in FIG. 22. The receiving unit 323 starts receiving operation (S6010 in FIG. 23). The signal includes, from the top, information items such as: an display apparatus ID for identifying the 3D video display apparatus; an ID of glasses for identifying the 3D video glasses 50 that has been identified by the 3D video display apparatus which transmits the signal; a time at which the 3D video glasses 50 has been identified, and a viewing state at the time when the 3D video glasses 50 has been identified, as in FIG. 29. When the 3D video display apparatus which is the transmission source identifies a plurality of the 3D video glasses 50, information items on the plurality of the 3D video glasses 50 are transmitted as a sequence of data items. The receiving unit 323 waits for a radio signal of which the signal format matches (S6020). When the signal is received in Step S6020 (Yes in S6020), the receiving unit 323 outputs the information included in the received signal to the integration processing unit 334, and the operation proceeds to Step S6030. Step S6020 will be repeated when the signal is not received in Step S6020 (No in S6020). In Step S6030, the integration processing unit 334 integrates the information on the viewing state stored in the 3D video display apparatus 13b neighboring the subject 3D video display apparatus 13a, which is included in the signal received by the receiving unit 323 in Step S6020, and the information on the viewing state stored in the state storage unit 315 of the subject 3D video display apparatus 13a (S6030), and stores the integrated information into the history storage unit 335 (S6040). Subsequent to Step S6040, the operation returns to Step S6020. The 3D video display apparatus 13a repeats operations from Step S6020 to Step S6040, thereby generating and storing history of the viewing state of the user via communication with the neighboring 3D video display apparatus 13b.

FIG. 28 is a flow chart illustrating the details of the operation performed by the integration processing unit 334 in Step S6030. In Step S6030, the integration processing unit 334 extracts an unprocessed information item on the ID of glasses using the ID of glasses and information on the viewing state received in Step S6020 (S6131). When an unprocessed information item on the ID of glasses is not present in Step S6131 (Yes in S6131), the operation proceeds to Step S6040. When an unprocessed information item on the ID of glasses is present in Step S6131 (No in S6131), the integration processing unit 334 searches the state storing unit 315 of the subject 3D video display apparatus 13a for an ID of glasses which matches an unprocessed ID of glasses which is extracted in Step S6131 and is stored in the neighboring 3D video display apparatus (S6133). When it is determined, in Step S6133, that a matching ID of glasses is stored in the state storage unit 315 (Yes in S6133), the operation proceeds to Step S6134. When it is determined, in Step S6133, that a matching ID of glasses is not stored in the state storage unit 315 (No in S6133), the operation returns to Step S6131. The determination that no matching ID of glasses is present in Step S6133 indicates that the user who wears the 3D video glasses 50 and views the 3D video display apparatus 13b which is the transmission source is not viewing the subject 3D video display apparatus 13a. It is therefore unnecessary to perform at least the processing for alleviating fatigue caused by the subject 3D video display apparatus 13a.

In Step S6134, the integration processing unit 334 rearranges, according to the time, the order of information items on the viewing state, in each time, of the ID of glasses which is extracted in Step S6133 and stored in both of the state storage unit 315 in the 3D video display apparatus 13a and the 3D video display apparatus 13b which is the transmission source (S6134). In addition, the integration processing unit 334 generates, for the information items on the viewing state on which the order rearrangement has been performed in Step S6134, data in which: the ID of glasses stored in both of the state storage unit 315 in the subject 3D video display apparatus 13a and the 3D video display apparatus 13b which is the transmission source; and the viewing information indicating which of the 3D video display apparatuses is viewed, are associated with the time at which the information is obtained (S6135), and outputs the generated data to the history storage unit 335. The history storage unit 335 stores the data generated in Step S6035 (S6040). FIG. 30 shows an example of data stored in the history storage unit 335. The history storage unit 335 stores the viewing state which shows, for the ID of glasses stored in the state storage unit 315 of the subject 3D video display apparatus 13a, which one of the 3D video display apparatuses is viewed for each time. For example, it is indicated that a user who wears the 3D video glasses 50 having the ID of glasses was viewing the subject 3D video display apparatus 13a at the time of "10:32:15.55".

It is to be noted that, here, the integration processing unit 334 integrates the items of viewing state information, for each of the 3D video glasses 50, from the information obtained from the receiving unit 323 and the information stored in the state storage unit 315. However, the items of viewing state information may be integrated using the association between the ID of glasses stored in the history storage unit 335 and the ID of glasses included in the received information.

In addition, here, the integration processing unit 334 performs matching check between the received ID of glasses and each of the IDs of glasses stored in the state storage unit 315, however, the matching check may be performed only with the information temporally subsequent to the time stored in the history storage unit 325, by referring to the history storage unit 335.

It is to be noted that, two apparatuses; that is, the 3D video display apparatus 13a and the 3D video display apparatus 13b, are illustrated here as the 3D video display apparatuses which are positioned close to each other in FIG. 27 for the sake of simplicity, however, the same processes are performed also in the case where three or more 3D video display apparatuses are positioned close to each other and a user alternately views three or more 3D video images.

Step S3000 includes Step S3110 to Step S3090 of Embodiment 2 illustrated in FIG. 18, however, only the operation of Step S3180 differs from that of Embodiment 2. For that reason, description for that will be given below.

The high-frequency-change detecting unit 336 determines whether or not the viewing state associated with one or more IDs of glasses stored in the history storage unit 335 changes at a high frequency (S3180). The high-frequency-change detecting unit 336 extracts information on the ID of glasses which includes time information prior to the current time in a predetermined time period, from the history storage unit 335. The predetermined time period is 10 seconds, for example. When switching of the 3D video display apparatuses which is viewed is detected at a higher frequency than a predetermined frequency, more than or equal to three times in ten seconds, for example, in the extracted information, it is determined as a high-frequency change in the viewing state. However, the case is excluded where the time when none of the 3D video display apparatuses is viewed is included for a predetermined amount of time or longer. The predetermined time period is three seconds, for example. When the high-frequency change in the viewing state is detected in Step S3180, the operation proceeds to Step S4000. When the high-frequency change in the viewing state is not detected in Step S3180, the operation proceeds to Step S3090.

As described above, in the case where there are a plurality of 3D video display apparatuses which display 3D video images and are located in the vicinity, the 3D video display apparatuses communicate with each other, accurately detect the state in which a user alternately views 3D video images displayed on the respective 3D video display apparatuses at a high frequency, and render the 3D video images into 2D video images to be displayed. With this, it is possible to avoid only the state which is likely to produce fatigue and in which depth change frequently occurs due to frequent scene change caused by user's viewing action of alternately viewing the 3D video images, without performing the processing in such a case with smaller strain as alternately viewing an video image and a real space, thereby allowing for alleviation of user's fatigue caused by the user action without disrupting the viewing of 3D video images by the user as much as possible.

Modification of Embodiment 3

The communicating unit 800 of Embodiment 3 communicates with another 3D video display apparatus neighboring the subject 3D video display apparatus in Step S6000 illustrated in FIG. 22 and FIG. 23, and integrates the viewing states of a user which have been sensed by the both apparatuses. In Modification of Embodiment 3, in addition to the above, depth information items of 3D video images displayed by the both apparatuses are communicated and the rendering processing into 2D video images is performed when there is a large difference in the depth between the 3D video display apparatuses. The rendering processing into 2D video images is not performed when the difference in the depth between the 3D video display apparatuses is small, and a user can continue to view the 3D video images. Fatigue is caused by switching, at a high frequency, video images between which the difference in depth is large. Thus, a small difference in depth does not lead to fatigue even when a user alternately views a plurality of 3D video display apparatuses. The rendering processing into 2D video images is performed only when the difference in depth between the 3D video display apparatuses is large, thereby allowing for alleviation of fatigue without impairing the value of viewing 3D video images as much as possible.

In this Modification, a plurality of 3D video display apparatuses are placed in the vicinity as illustrated in FIG. 20 of Embodiment 3, and the user 100 can alternately view 3D video images each of which is independently displayed on a different one of the plurality of 3D video display apparatuses. The plurality of 3D video display apparatuses can communicate with each other.

Figure 31:
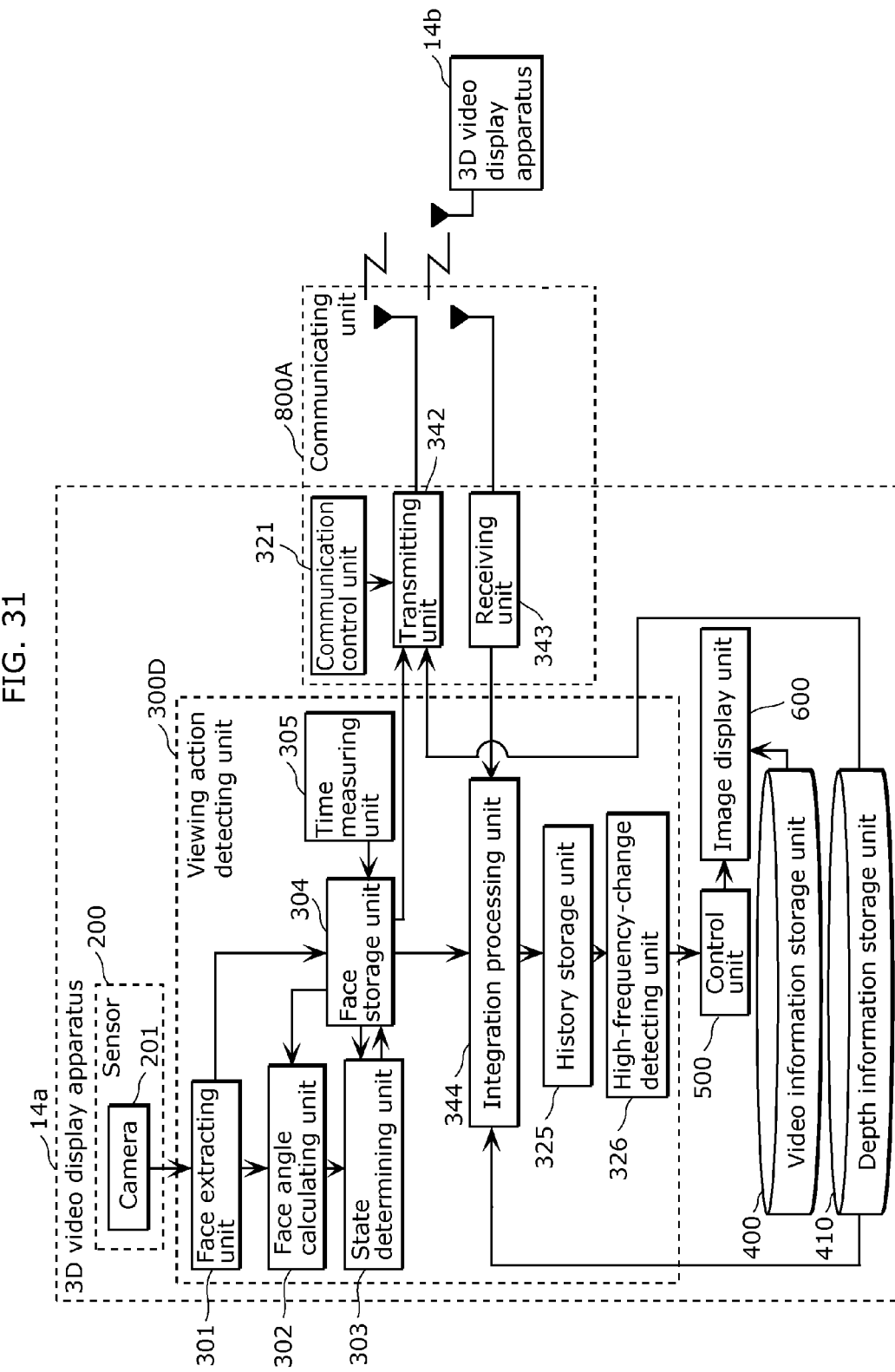
FIG. 31 is a block diagram showing an example of a configuration of the 3D video display apparatus according to a modification example of Embodiment 3.

FIG. 31 illustrates an example of detailed configuration of the 3D video display apparatus 14a according to Modification of Embodiment 3. The 3D video display apparatus in FIG. 31 has a configuration including: a depth information storage unit 410 in addition to the configuration of the 3D video display apparatus 12a illustrated in FIG. 21; a viewing action detecting unit 300D in place of the viewing action detecting unit 300B; and a communication unit 800A in place of the communication unit 800. The structural elements same as those in FIG. 21 share the same numerical references, and descriptions for them will be omitted as appropriate. The 3D video display apparatus 14b has the same configuration as that of the 3D video display apparatus 14a.

The sensor 200 includes a camera 201.

The viewing action detecting unit 300D includes: the face extracting unit 301; the face angle calculating unit 302; the state determining unit 303; the face storage unit 304; the time measuring unit 305; the integration processing unit 344; the history storage unit 325; and the high-frequency-change detecting unit 326.

The communicating unit 800A includes the communication control unit 321, a transmitting unit 342; and a receiving unit 343.

The depth information storage unit 410 stores depth information items corresponding to 3D video images stored in the video information storage unit 400. FIG. 32 is a diagram showing an example of the depth information stored in the depth information storage unit 410. In the example of FIG. 32, times, flame numbers of images, the minimum value, the maximum value, the median value, and the screen center value of depth of each of the frames, are stored. The unit of depth is centimeters, the front side is plus and the back side is minus with the surface of a screen being 0, and a depth distance is indicated which is perceived by a user who has a standard interpupillary distance when the user views the image screen from a standard viewing distance with respect to the screen size.

The transmitting unit 342 generates and transmits a transmission signal in which the time, the face ID, the feature amount of a face, and the viewing state which are stored in the face storage unit 304 are combined with the depth information stored in the depth information storage unit 410. The receiving unit 343 receives the signal including the time, the face ID, the feature amount of a face, the viewing state, and the depth information which are transmitted from another 3D video display apparatus 14b, and outputs information included in the received signal to the integration processing unit 344.

The integration processing unit 344 compares (i) the depth information of the 3D video image displayed by the 3D video display apparatus 14b other than the subject 3D video display apparatus 14a, which is received from the receiving unit 343, with (ii) the depth information stored in the depth information storage unit 410 of the subject 3D video image display apparatus 14a. In addition, the integration processing unit 344 integrates (i) the face information item which has been sensed by the 3D video display apparatus 14b other than the subject 3D video display apparatus 14a and (ii) the face information item stored in the face storage unit 304 of the subject 3D video display apparatus 14a to generate history of the viewing state for each of the faces, and outputs the history of the viewing state to the history storage unit 325.

Figure 33:
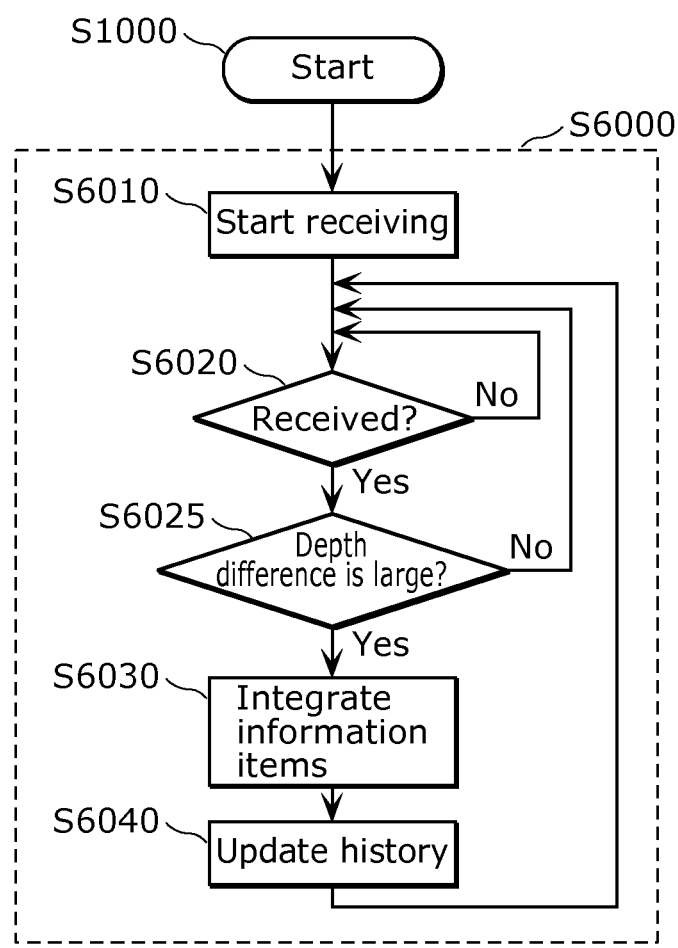
FIG. 33 is a flow chart showing an example of part of operations performed by the 3D video display apparatus according to the modification example of Embodiment 3.

FIG. 33 is a flow chart showing part of the operations performed by the 3D video display apparatus 14a illustrated in FIG. 31. The operations performed by the 3D video display apparatus 14a are the same as the operations illustrated in FIG. 22 except for the detailed operations of Step S6000 illustrated in FIG. 22 of Embodiment 3. FIG. 33 illustrates detailed operations of Step S6000. FIG. 33 is equivalent to FIG. 23 except for Step S6025 being added to the operations from Step S6010 to Step S6040 of Embodiment 3 illustrated in FIG. 23. The operations same as the operations in FIG. 23 share the same numerical references, and descriptions for them will be omitted as appropriate. The following describes the detailed operations in Step S6000 with reference to FIG. 33.

Figure 34:
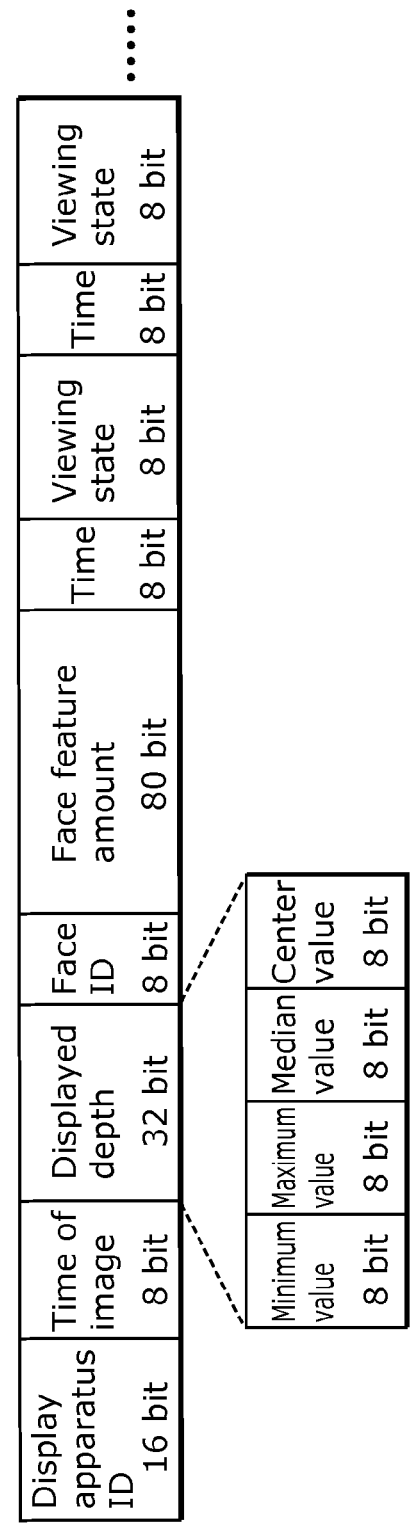
FIG. 34 is a diagram showing an example of a configuration of a signal communicated by a communicating unit according to the modification example of Embodiment 3.

The 3D video display apparatus 14a starts to operate in Step S1000. The receiving unit 343 starts receiving operation (S6010). The signal received by the receiving unit 343 is communicated by, for example, radio communication such as Bluetooth (registered trademark). The signal includes, from the top, information items such as: an display apparatus ID for identifying the 3D video display apparatus 14b; a display time of an image; depth information of a displayed image; a face ID and feature amount for identifying a face that has been sensed by the 3D video display apparatus 14*b* which transmits the signal; a time at which the face is sensed, and a viewing state which shows whether or not a user was viewing, at the time when the face was sensed, the 3D video display apparatus 14*b* which has transmitted the signal, as in FIG. 34. When the 3D video display apparatus 14*b* which is the transmission source senses a plurality of faces, information items on the plurality of faces are transmitted. The receiving unit 343 waits for a radio signal of which the signal format matches (S6020). When the signal is received in Step S6020 (Yes in S6020), the receiving unit 343 outputs the information included in the received signal to the integration processing unit 344, and the operation proceeds to Step S6025. Step S6020 will be repeated when the signal is not received in Step S6020 (No in S6020).

In Step S6025, the integration processing unit 344 compares (i) the depth information of the 3D video display apparatus 14*b* which is included in the signal received by the receiving unit 343 in Step S6020 with (ii) the depth information of the current time which is stored in the depth information storage unit 410 of the subject 3D video display apparatus 14*a* (S6205). The comparison, for example, is carried out as follows: when a sum of (i) an absolute value of difference between the minimum values of depth, (ii) an absolute value of difference between the maximum values of depth, (iii) an absolute value of difference between the median values of depth, and (iv) an absolute value of difference between the depth values at the center of the image screen, is larger than a predetermined value, it is determined that the difference is large between the depth of the video image displayed by the subject 3D video display apparatus 14*a* and the depth of the video image displayed by the 3D video display apparatus 14*b* which is the transmission source of the signal received in Step S6020, and when the above-described total value is smaller than or equal to the predetermined value, it is determined that the difference is small between the depth of the video image displayed by the subject 3D video display apparatus 14*a* and the depth of the video image displayed by the 3D video display apparatus 14*b* which is the transmission source. The predetermined value is, for example, 400 cm. When the above-described total value is larger than the predetermined value (Yes in S6025) in Step S6025, the operation proceeds to Step S6030. When the above-described total value is smaller than or equal to the predetermined value (No in S6025) in Step S6025, the operation returns to Step S6020.

In Step S6030, the integration processing unit 344 integrates (i) the information on the state of the face stored in the 3D video display apparatus 14*b* neighboring the subject 3D video display apparatus 14*a*, which is included in the signal received by the receiving unit 323 in Step S6020, (ii) and the information on the state of the face stored in the face storage unit 304 of the subject 3D video display apparatus 14*a* (S6030), and stores the integrated information into the history storage unit 325 (S6040). Subsequent to Step S6040, the operation returns to Step S6020. The 3D video display apparatus 14*a* repeats operations from Step S6020 to Step S6040, thereby generating and storing history of the viewing state of the user via communication with the neighboring 3D video display apparatus 14*b*.

As described above, in the case where there are a plurality of 3D video display apparatuses which display 3D video images and are located in the vicinity, the 3D video display apparatuses communicate with each other. The state in which a user alternately views a plurality of 3D video display apparatuses is detected only when there is a difference in depth of video images displayed by the respective 3D video display apparatuses, and the user is prone to fatigue when alternately viewing the plurality of 3D video display apparatuses. When the state of alternately viewing is detected, the 3D video images are rendered into 2D video images and displayed. With this, it is possible to avoid only the state in which a user is prone to fatigue due to frequent changes in depth resulting from frequent scene change caused by the user's viewing action, while not interrupting the joy of or reducing the convenience in viewing the 3D video images when alternately viewing a plurality of 3D video display apparatuses is not likely cause fatigue.

It is to be noted that, although the Modification of Embodiment 3 is described here, Embodiment 4 may also be modified in the same manner. As with the present Modification, the 3D video display apparatus 13*a* illustrated in FIG. 27 according to Embodiment 4 may further include the depth information storage unit 410, and the transmitting unit 322, the receiving unit 323, the integration processing unit 334 may be replaced with the transmitting unit 342, the receiving unit 343, and the integration processing unit 344, respectively. In addition, Step S6025 is added to the operations in Step S6000, and prior to integrating, in Step S6030, (i) the information of the 3D video glasses 50 worn by a user who views the subject 3D video display apparatus 13*a* and (ii) the information of the 3D video glasses 50 worn by a user who views the 3D video display apparatus 13*b* which is the transmission source of the signal, the scale of difference is determined between the depth of the video image displayed by the subject 3D video display apparatus 13*a* and the depth of the video image displayed by the 3D video display apparatus 13*b* which is the transmission source. When the difference in the depths is large between the 3D video display apparatuses, the 3D video images are rendered into 2D video images and displayed. When the difference in the depths is small, the 3D video images are displayed as they are.

It is to be noted that, the 3D video images are rendered into 2D video images and displayed, as depth smoothing processing for preventing fatigue in the present Modification. However, any other methods may be employed as long as the processing reduces the difference in depths between the 3D video display apparatuses. The methods include, for example, uniforming the depths of all of the video images displayed by the 3D video display apparatuses which a user alternately views, with the average value of the depths of the video images displayed on the 3D video display apparatus which are alternately viewed.

It is to be noted that, although the depth information stored in the depth information storage unit 410 and the depth information communicated by the communicating unit 800A are each the depth information of an image displayed in a specified time, and the depth includes the minimum value, the maximum value, the median value, and the screen center value in this present Modification, information other than the above described information may be used. The specified time indicates a specified time during the operation of the 3D video display apparatus 14*a*, however, the time may have a certain time range instead of being a specified point of time. The specified time may be a certain time range having a certain time point during the operation of the 3D video display apparatus 14*a* as the starting point, the center point, or the end point, and the depth information in such a case may be a representative value of the depth information in the time range such as the time average or the median value of the depth. In addition, the depth information may be only the minimum value and the maximum value, only the median value, only the screen center value, or the depth information for each object.

It is to be noted that, in Embodiment 1, Embodiment 2, Embodiment 3, and Embodiment 4, the high-frequency-change detecting unit determines that there is a high-frequency change in the viewing state when a predetermined number, three times, for example, of changes in the viewing state are detected in a predetermined time period, 10 seconds, for example. However, the value for determining the high-frequency change in viewing state may be a value other the value described above. As a reference case for the possibility that high-frequency changes in viewing state might pose an adverse impact on a user who views video images, there are guidelines taking the optically-stimulated epileptic seizure or the optical susceptibility reaction is into consideration as described in Non Patent Literature (NPL) 4.

The standard described in NPL 4 is a guideline for reducing the effect of light pulses on viewer, and a sudden cut change is mentioned in the item 2 of NPL 4. Taking into consideration that the depth information also suddenly changes due to the cut change (scene change), it is desirable that the frequency exceeding "one-third of a second" which is pointed out in NPL 4 is regarded as a high-frequency viewing state. It is to be noted that, the standard described in NPL 4 can be applied to the case where a user is viewing the same 3D video image. For example, when a scene change occurs at a frequency exceeding "one-third of a second" in the same 3D video image, the high-frequency-change detecting unit may offer a caution to the user that there is a possibility of triggering eye fatigue. In addition, the control unit may end the display of the 3D video.

It is to be noted that, in the Modification of Embodiment 3, the integration processing unit 344 compares the depth information of the 3D video image displayed by the subject 3D video display apparatus and the depth information displayed by another neighboring 3D video display apparatus. As an example of comparison method, when a sum of (i) an absolute value of difference between the minimum values of depth, (ii) an absolute value of difference between the maximum values of depth, (iii) an absolute value of difference between the median values of depth, and (iv) an absolute value of difference between the depth values at the center of the image screen is larger than a predetermined value, it is determined that the difference is large between the depth of the video image displayed by two 3D video display apparatuses. However, the difference in depth may be determined based on the difference in convergence angle, other than using the difference in depth. For example, NPL 5 suggests that the difference in depths have one or smaller degree of parallactic angle in one image screen, and that a relative depth with respect to the image screen be approximately 2% or smaller with respect to the width of the image screen. In view of the above, the integration processing unit compares the depth information of the 3D video image displayed by the subject 3D video display apparatus and the depth information displayed by the other neighboring 3D video display apparatus as below. For example, the integration processing unit calculates a convergence angle at a standard viewing position with respect to the depth at the center of the image screen for each of the video images displayed by the subject 3D video display apparatus and the other neighboring 3D video display apparatus. In the case where the difference in the convergence angle; that is, the parallactic angle when comparing the center of each of the image screens is one or larger degree, the integration processing unit is capable of determining that the difference in depths between the 3D video images displayed by two 3D video display apparatuses. In addition, the difference in depth may be determined by calculating the convergence angle with respect to the portion having the smallest depth in the video item displayed on each of the apparatuses; that is, the portion which is viewed with a shortest distance, and calculating the parallactic angle when comparing the both image screens. In addition to the above, the parallactic angle may be obtained from the convergence angle with respect to the average of depths of video images displayed on each of the apparatuses.

It is to be noted that, although the example is provided in which a user views display of a plurality of neighboring 3D video display apparatuses in all of the Embodiments and the Modifications of the disclosure, the same holds true for the system capable of displaying, in parallel, a plurality of 3D video images on a plurality of image screens. The plurality of image screens may be implemented by a plurality of display apparatuses, or may be implemented by splitting a single display image screen into a plurality of regions and display. More specifically, the plurality of 3D video display apparatuses according to the present disclosure also means display screens of 3D video images displayed on a single display apparatuses.

In medical practice or medical education, 3D images are used which are obtained by combining data items of a diagnostic imaging unit such as computed tomography (CT) or magnetic resonance imaging (MRI). Meanwhile, in operation, 3D video images are used in endoscopic surgeries, tele-surgeries, and so on. In medical practice, when discussing the condition of a patient and courses of treatment in conferences before and after operation, or the like, it is useful to compare 3D video images of different kinds which are obtained by combining data items of the above-described diagnostic imaging unit. In addition, it is useful to consider by comparing 3D operation video image and combined 3D video images. When providing a patient with explanations, the explanations can be comprehended by the patient more easily with display of different 3D video images on a plurality of screens. In terms of medical education, it is useful to check video images of an actual operation in multiple directions, while examining, with rotation or zooming, 3D video images obtained by combining images captured before operation. One or more exemplary embodiments disclosed herein are effective when using a plurality of 3D video images by concurrently displaying them as described above.

It is to be noted that, each of the structural elements in the above-described exemplary embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, software that accomplishes the 3D video display apparatus according to each of the above-described embodiments is a program as below.

More specifically, the program causes a computer to execute: detecting whether or not a viewing state of a user who views a plurality of 3D video display screens with a viewing target being changed between the 3D video display screens has changed a predetermined number of times or more in a predetermined time period; and restricting user's viewing action of viewing a 3D video image displayed by an image display unit when it is detected, in the detecting, that the viewing state of the user has changed the predetermined number of times or more in the predetermined time period.

The 3D video display apparatus according to one or more aspects of the present disclosure have been described based on the embodiments, however, the present disclosure is not limited to these embodiments. Those skilled in the art will readily appreciate that various modifications may be made in the exemplary embodiments, and other embodiments may be made by arbitrarily combining some of the structural elements of different exemplary embodiments without materially departing from the principles and spirit of the inventive concept, the scope of which is defined in the appended Claims and their equivalents.

INDUSTRIAL APPLICABILITY

One or more exemplary embodiments disclosed herein are widely applicable to image display apparatuses for viewing 3D video images and useful when displaying 3D video images on display screens or the like of television sets, computers, games, and so on. Possible applications include not only viewing content but also image display of medical devices such as diagnostic imaging units and endoscopes, systems for games and educational trainings such as simulation of operations or vehicles, and so on.

The invention claimed is:

1. A three-dimensional (3D) video display apparatus comprising:
   a viewing action detecting unit configured to detect whether or not a viewing state of a user who views a plurality of 3D video display screens with a viewing target being changed between the 3D video display screens has changed a predetermined number of times or more in a predetermined time period; and
   a control unit configured to restrict user's viewing action of viewing a 3D video image displayed by an image display unit when the viewing action detecting unit detects that the viewing state of the user has changed the predetermined number of times or more in the predetermined time period.

2. The 3D video display apparatus according to claim 1, further comprising
   a camera which captures an image of a face of the user,
   wherein the viewing action detecting unit includes:
   a face angle calculating unit configured to calculate an angle of the face, using the image of the face captured by the camera;
   a state determining unit configured to determine whether or not the user is viewing one of the plurality of 3D video display screens, based on the angle of the face calculated by the face angle calculating unit; and
   a high-frequency-change detecting unit configured to detect, based on a result of the determination by the state determining unit, whether or not the viewing state of the user has changed the predetermined number of times or more in the predetermined time period.

3. The 3D video display apparatus according to claim 1, further comprising
   a light receiving unit configured to receive light emitted by a light emitting unit mounted on special glasses worn by the user,
   wherein the viewing action detecting unit includes:
   an incident angle measuring unit configured to measure an incident angle of the light emitted by the light emitting unit into the light receiving unit;
   a state determining unit configured to determine whether or not the user is viewing one of the plurality of 3D video display screens, based on the incident angle measured by the incident angle measuring unit; and
   a high-frequency-change detecting unit configured to detect, based on a result of the determination by the state determining unit, whether or not the viewing state of the user has changed the predetermined number of times or more in the predetermined time period.

4. The 3D video display apparatus according to claim 3,
   wherein the light emitting unit is configured to emit circular light, and
   the incident angle measuring unit is configured to measure, based on a shape of the light received by the light receiving unit, the incident angle of the light emitted by the light emitting unit into the light receiving unit.

5. The 3D video display apparatus according to claim 1, further comprising:
   a camera which captures an image of a face of the user; and
   one of the plurality of 3D video display screens,
   wherein the viewing action detecting unit includes:
   a face extracting unit configured to extract, from the image of the face captured by the camera, a feature amount of the image of the face;
   a face angle calculating unit configured to calculate an angle of the face, using the image of the face captured by the camera;
   a state determining unit configured to determine, based on the angle of the face calculated by the face angle calculating unit, whether or not the user is viewing the one of the plurality of 3D video display screens;
   a receiving unit configured to receive, from another 3D video display apparatus, a feature amount of an image of a face and a determination result indicating whether or not the user is viewing another one of the plurality of 3D video display screens included in the other 3D video display apparatus; and
   a high-frequency-change detecting unit configured to (i) determine whether or not a same user views the one of the plurality of 3D video display screens included in the 3D video display apparatus and the other one of the plurality of 3D video display screens included in the other 3D video display apparatus, by comparing the feature amount of the image of the face extracted by the face extracting unit with the feature amount of the image of the face received by the receiving unit, and (ii) when it is determined that the same user views the one of the plurality of 3D video display screens included in the 3D video display apparatus and the other one of the plurality of 3D video display screens included in the other 3D video display apparatus, detect whether or not the viewing state of the same user has changed the predetermined number of times or more in the predetermined time period, based on the result of determination by the state determining unit and the determination result received by the receiving unit.

6. The 3D video display apparatus according to claim 1, further comprising:
   a light receiving unit configured to receive light which is emitted by a light emitting unit mounted on special glasses worn by the user and which has a light emitting pattern by which the glasses are identified; and
   one of the plurality of 3D video display screens,
   wherein the viewing action detecting unit includes:
   a glasses identifying unit configured to identify glasses based on the light emitting pattern of the light received by the light receiving unit;
   an incident angle measuring unit configured to measure an incident angle of the light emitted by the light emitting unit into the light receiving unit;
   a state determining unit configured to determine, based on the incident angle measured by the incident angle measuring unit, whether or not the user is viewing the one of the plurality of 3D video display screens;
   a receiving unit configured to receive, from another 3D video display apparatus, an identification result of glasses worn by a user who is viewing another one of the plurality of 3D video display screens included in the other 3D video display apparatus and a determination result indicating whether or not the user is viewing the other one of the plurality of 3D video display screens included in the other 3D video display apparatus; and a high-frequency-change detecting unit configured to (i) determine whether or not a same user views the one of the plurality of 3D video display screens included in the 3D video display apparatus and the other one of the plurality of 3D video display screens included in the other 3D video display apparatus, by comparing a result of the identification by the glasses identifying unit with the identification result received by the receiving unit, and (ii) when it is determined that the same user views the one of the plurality of 3D video display screens included in the 3D video display apparatus and the other one of the plurality of 3D video display screens included in the other 3D video display apparatus, detect whether or not a viewing state of the same user has changed the predetermined number of times or more in the predetermined time period, based on the result of determination by the state determining unit and the determination result received by the receiving unit.

7. The 3D video display apparatus according to claim 1, wherein the control unit is configured to render a 3D video image into a 2D video image and display the 2D video image on the image display unit when the viewing action detecting unit detects that the viewing state of the user has changed the predetermined number of times or more in the predetermined time period.

8. The 3D video display apparatus according to claim 1, wherein the control unit is configured to display, on the image display unit, an attention-drawing message regarding viewing of the 3D video image when the viewing action detecting unit detects that the viewing state of the user has changed the predetermined number of times or more in the predetermined time period.

9. The 3D video display apparatus according to claim 5, wherein the receiving unit is further configured to receive, from the other 3D video display apparatus, depth information of the 3D video image displayed by the other 3D video display apparatus, and the control unit is configured to execute processing for restricting user's viewing action of viewing the 3D video image displayed by the image display unit only when the viewing action detecting unit detects that the viewing state of the user has changed the predetermined number of times or more in the predetermined time period, and a difference between depth information of a 3D video image displayed by the image display unit and the depth information of the 3D video image displayed by the other 3D video display apparatus is a predetermined value or larger.

10. A three-dimensional (3D) video display method comprising:

detecting whether or not a viewing state of a user who views a plurality of 3D video display screens with a viewing target being changed between the 3D video display screens has changed a predetermined number of times or more in a predetermined time period; and restricting user's viewing action of viewing a 3D video image displayed by an image display unit when it is detected, in the detecting, that the viewing state of the user has changed the predetermined number of times or more in the predetermined time period.

11. A non-transitory computer-readable recording medium having a computer program recorded thereon for causing the computer to execute the 3D video display method according to claim 10.

* * * * *